United States Patent
Chae

(10) Patent No.: US 7,345,716 B2
(45) Date of Patent: Mar. 18, 2008

(54) ARRAY SUBSTRATE WITH DRIVING TFT AND SYNCHRONIZATION ADJUSTING TFT

(75) Inventor: Gee-Sung Chae, Incheon (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 0 days.

(21) Appl. No.: 11/799,440

(22) Filed: May 1, 2007

(65) Prior Publication Data

US 2007/0200991 A1    Aug. 30, 2007

Related U.S. Application Data

(62) Division of application No. 10/879,801, filed on Jun. 29, 2004, now Pat. No. 7,230,658.

(30) Foreign Application Priority Data

Jun. 30, 2003    (KR)    ............ 2003-0044000

(51) Int. Cl.
  *G02F 1/136*    (2006.01)
  *G02F 1/1343*    (2006.01)
(52) U.S. Cl. .................... 349/48; 349/54
(58) Field of Classification Search ........ 349/54, 349/48

See application file for complete search history.

(56) References Cited

U.S. PATENT DOCUMENTS 6,486,930 B1 *  11/2002  Kwon ............... 349/48
6,958,802 B2 *  10/2005  Watamura ......... 349/192

* cited by examiner

*Primary Examiner*—David Nelms
*Assistant Examiner*—Phu Vu
(74) *Attorney, Agent, or Firm*—Brinks Hofer Gilson & Lione

(57) ABSTRACT

A substrate includes adjacent first and second pixel regions defined by first and second gate lines extending in a first direction and a data line extending in a second direction that crosses the gate lines. First and second driving thin film transistors formed in the first and second pixel regions, respectively, are connected to the data line. A first synchronization adjusting thin film transistor formed in the first pixel region and is connected to the second gate line. A first connection line is connected to the first driving thin film transistor and the first synchronization adjusting thin film transistor. The first connection line overlaps a conductive line along a direction of extension of the conductive line. First and second pixel electrodes are connected to the first synchronization adjusting thin film transistor and the second driving thin film transistor, respectively.

50 Claims, 31 Drawing Sheets

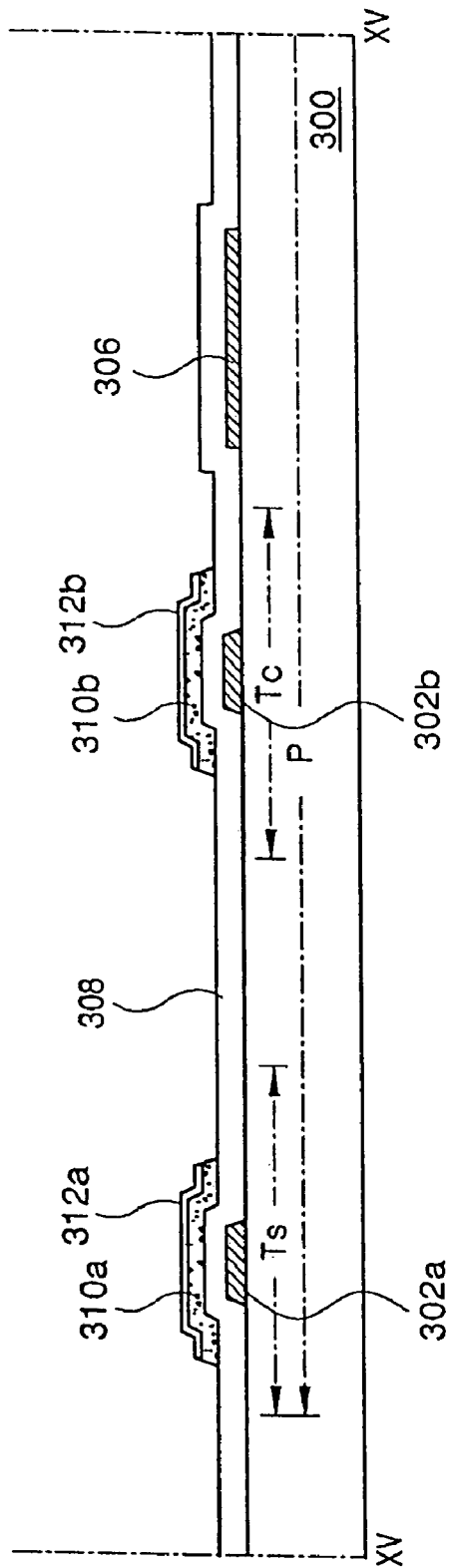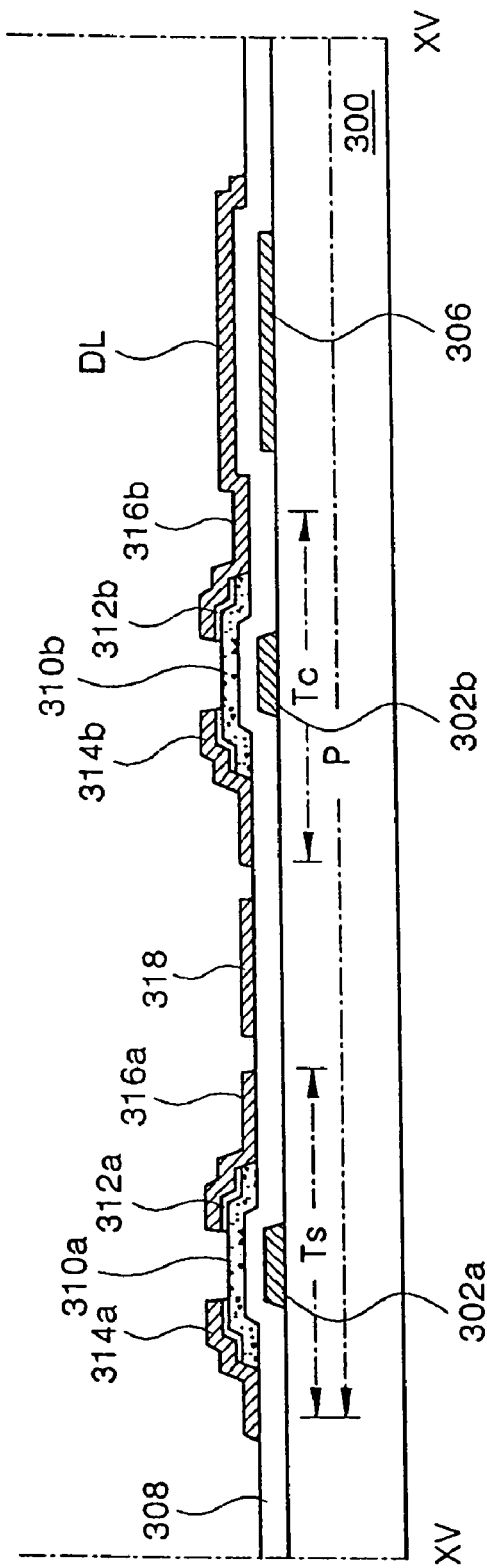
FIG. 15A
FIG. 15B

ARRAY SUBSTRATE WITH DRIVING TFT AND SYNCHRONIZATION ADJUSTING TFT

PRIORITY CLAIM

The present application is a divisional of U.S. patent application Ser. No. 10/879,801, filed Jun. 29, 2004 now U.S. Pat. No. 7,230,658.

This application claims the benefit of Korean Patent Application No. 2003-0044000, filed in Korea on Jun. 30, 2003, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for a liquid crystal display (LCD) device and a manufacturing method of the same.

2. Discussion of the Related Art

In general, a liquid crystal display (LCD) device utilizes the optical anisotropy and birefringence properties of liquid crystal molecules to display images. The liquid crystal display (LCD) device usually has first and second substrates spaced apart from and opposing each other. The first and second substrates respectively have electrodes for forming an electric field between the electrodes. That is, if voltage is applied to the electrodes of the liquid crystal display (LCD) device, an electric field is formed between the electrodes and the electric field changes alignments of the liquid crystal molecules. The changed alignments of the liquid crystal molecules control a light transmittance through the liquid crystal and thus images can be displayed by controlling the light transmittance through the liquid crystal.

FIG. 1 is an exploded perspective view of a related art liquid crystal display (LCD) device. In FIG. 1, a liquid crystal display (LCD) device 11 has an upper substrate 5 having a black matrix 6, a color filter layer 8, and a common electrode 18 on the color filter layer 8, and a lower substrate 22 having a switching element T and a pixel electrode 17 at each pixel region P defined on the lower substrate 22. A liquid crystal layer 14 is interposed between the upper substrate 5 and the lower substrate 22.

Array lines are formed around the pixel region P. The lower substrate 22 may be commonly referred to as an array substrate. Thin film transistors T are arranged in a matrix form as the switching element, and are disposed crossing portions of gate and data lines 13 and 15. The gate and data lines 13 and 15 define the pixel region P by crossing each other, and in the pixel region P, the transparent pixel electrode 17 is formed. The pixel electrode 17 is formed of transparent conductive metal material such as indium tin oxide (ITO) that relatively reflects light well.

A storage capacitor C connected to the pixel electrode 17 in parallel is formed over the gate line 13. A portion of the gate line 13 serves as a first storage electrode and a metal layer 30 formed of the same material as source and drain electrodes serves as a second storage electrode. The metal layer 30 is connected to the pixel electrode 17, and receives signals of the pixel electrode 17.

The number of array lines and driving integrated circuits of the LCD device having the above structure increase as the size of the device increases or the resolution of the device increases.

To reduce the number of driving integrated circuits, a method for driving two pixels by using one data line and one gate line has been researched.

In this method, time variation is generated in two pixels commonly connected to one data line by switching a thin film transistor on and off, and thus sequential data signals are applied to the two pixels.

However, the method needs more thin film transistors at each pixel as compared with a general structure. This decreases an aperture ratio of the device. In addition, the numbers of thin film transistors are asymmetric in adjacent pixels with respect to the data line commonly contacted by the adjacent pixels.

FIG. 2 is a plan view showing an array substrate for a liquid crystal display device having a data line sharing structure according to a first embodiment of the related art.

As shown in FIG. 2, gate lines 31 are formed on a substrate 30 in a first direction and a data line 46 is formed in a second direction. The gate lines 31 and the data line 46 perpendicularly cross each other to define a first pixel region P1 and a second pixel region P2. Transparent pixel electrodes 52 and 54 are formed in the first and second pixel regions P1 and P2, respectively.

A driving thin film transistor (TFT) Ts is formed in each pixel region P1 and P2. A synchronization adjusting thin film transistor (TFT) Tc is formed in the first pixel region P1, and inputs signals from the driving TFT Ts to the pixel electrode 52. The synchronization adjusting TFT Tc can be formed in one of two pixel regions, which are referred to as an odd pixel region or an even pixel region, adjoining each other with respect to a particular data line 46.

The driving TFTs Ts formed in the adjacent pixel regions P1 and P2 are connected to the same data line 46. Different signals are transmitted through the data line 46. The synchronization adjusting TFT Tc is formed to sequentially transmit the different signals.

Each driving TFT Ts includes a gate electrode 32a, an active layer 38a, a source electrode 42a, and a drain electrode 44a. The synchronization adjusting TFT Tc includes a gate electrode 32b, an active layer 38b, a source electrode 42b, and a drain electrode 44b.

A common line 36 is formed parallel to and spaced apart from the gate lines 31, and traverses the first and second pixel regions P1 and P2. A metal pattern 45 is formed over the common line 36 in each pixel region P1 and P2. The metal pattern 45 is connected to each pixel electrode 52 and 54. Thus, a storage capacitor Cst is formed in each pixel region P1 and P2. The common line 36 functions as a first electrode and the metal pattern 45 acts as a second electrode of the storage capacitor Cst.

In the pixel region P1 where the driving TFT Ts and the synchronization adjusting TFT Tc are formed, the driving TFT Ts and the synchronization adjusting TFT Tc are connected to adjacent gate lines 31, respectively, and thus are spaced apart from each other.

Accordingly, in the first pixel region P1, the first drain electrode 44a of the driving TFT Ts and the second source electrode 42b of the synchronization adjusting TFT Tc are connected to each other through a connection line 48.

Since the additional connection line 48 is formed, the aperture ratio of the pixel region containing the additional connection line 48 and synchronization adjusting TFT Tc is decreased.

FIGS. 3 and 4 show cross-sections of an array substrate for a liquid crystal display device according to the first embodiment of the related art. FIG. 3 is a cross-sectional view along the line III-III of FIG. 2 and FIG. 4 is a cross-sectional view along the line IV-IV of FIG. 2.

As shown in FIGS. 3 and 4, first and second pixel regions P1 and P2 are defined on a substrate 30. A driving TFT Ts is formed in each pixel region P1 and P2, and a synchronization adjusting TFT Tc is formed in the first pixel region P1. The synchronization adjusting TFT Tc is connected to the driving TFT Ts in the first pixel region P1. The driving TFT Ts and the synchronization adjusting TFT Tc are simultaneously formed through the same process.

More particularly, a gate electrode 32a for the driving TFT Ts and a gate electrode 32b for the synchronization adjusting TFT Tc are formed on the substrate 30. Although not shown in the figures, gate lines are formed of the same material in the same layer as the gate electrodes 32a and 32b. The gate lines are spaced apart from each other, and are connected to the gate electrodes 32a and 32b, respectively.

A gate insulating layer 33 is formed on the gate electrodes 32a and 32b, and active layers 38a and 38b and ohmic contact layers 40a and 40b are formed by sequentially depositing intrinsic amorphous silicon and impurity-doped amorphous silicon and then patterning these layers.

Source electrodes 42a and 42b and drain electrodes 44a and 44b are formed on the ohmic contact layers 40a and 40b. The source electrodes 42a and 42b are near by and spaced apart from the drain electrodes 44a and 44b, respectively. At the same time, a connection line 48 is formed to connect the drain electrode 44a of the driving TFT Ts with the source electrode 42b of the synchronization adjusting TFT Tc in the first pixel region P1.

Next, a passivation layer 50 is formed by depositing an inorganic insulating material such as silicon nitride ($SiN_x$) and silicon oxide ($SiO_2$) on an entire surface of the substrate 30 including the source electrodes 42a and 42b and the drain electrodes 44a and 44b of the driving TFT Ts and the synchronization adjusting TFT Tc thereon.

Pixel electrodes 52 and 54 are formed on the passivation layer 50 in respective pixel regions P1 and P2. The pixel electrode 52 of the first pixel region P1 is connected to the driving TFT Ts and the synchronization adjusting TFT Tc and the pixel electrode 54 of the second pixel region P2 is connected to the driving TFT Ts.

As stated above, the connection line 48 connecting the driving TFT Ts and the synchronization adjusting TFT Tc occupies a portion of the first pixel region P1 and thus both substantially reduces the aperture ratio of the LCD device and causes non-uniform brightness in adjacent pixels with respect to the data line 46. Thus, the quality of the images produced is lowered.

FIG. 5 is a plan view showing an array substrate for a liquid crystal display device according to a second embodiment of the related art. The array substrate of the second embodiment also has the above-mentioned problems.

As shown in FIG. 5, gate lines 61 are formed in a first direction on a substrate 60, and data lines 76 are formed in a second direction crossing the first direction. The gate lines 61 and the data lines 76 perpendicularly cross each other to define a plurality of pixel regions P.

In each pixel region P, a driving TFT Ts and a synchronization adjusting TFT Tc are formed. The driving TFT Ts includes a gate electrode 62a, an active layer 66a over the gate electrode 62a, and source and drain electrodes 70a and 72a spaced apart from each other over the active layer 66a. The synchronization adjusting TFT Tc includes a gate electrode 62b, an active layer 66b over the gate electrode 62b, and source and drain electrodes 70b and 72b spaced apart from each other over the active layer 66b. Additionally, a transparent pixel electrode 80 is formed in each pixel region P.

The drain electrode 72a of the driving TFT Ts is connected to the source electrode 70b of the synchronization adjusting TFT Tc through a connection line 74, and the drain electrode 72b of the synchronization adjusting TFT Tc is connected to the pixel electrode 80.

In this embodiment, adjacent pixel regions up and down in the context of the figure are commonly connected to a single gate line 61 and receive signals. Therefore, to sequentially apply the signals to the pixels, the driving TFT Ts and the synchronization adjusting TFT Tc are formed in one pixel region P. The driving TFT Ts and the synchronization adjusting TFT Tc in the same pixel region P are connected to different gate lines 61.

A common line CL is also formed in the pixel region P and is spaced apart from and parallel to the gate line 61.

A storage capacitor Cst is formed over the common line CL. A part of the common line CL functions as a first electrode and an extension part 75 extending from the drain electrode 72b of the synchronization adjusting TFT Tc acts as a second electrode of the storage capacitor Cst.

The aperture ratio of the LCD device according to this embodiment is also reduced due to the connection line 74 for connecting the driving TFT Ts and the synchronization adjusting TFT Tc.

FIGS. 6 and 7 show cross-sections of an array substrate for a liquid crystal display device according to the second embodiment of the related art. FIG. 6 is a cross-sectional view along the line VI-VI of FIG. 5 and FIG. 7 is a cross-sectional view along the line VII-VII of FIG. 5.

As shown in the figures, a driving TFT Ts and a synchronization adjusting TFT Tc are formed in each pixel region P, which is defined on a substrate 60.

A gate electrode 62a of the driving TFT Ts and a gate electrode 62b of the synchronization adjusting TFT Tc are formed on the transparent insulating substrate 60. A gate insulating layer 64 is formed on the gate electrodes 62a and 62b, and active layers 66a and 66b and ohmic contact layers 68a and 68b are formed on the gate insulating layer 64 by sequentially depositing amorphous silicon (a-Si:H) and doped amorphous silicon (n+ or p+ a-Si:H) and then patterning them.

Source electrodes 70a and 70b and drain electrodes 72a and 72b are formed on the ohmic contact layers 68a and 68b. The source electrodes 70a and 70b are spaced apart from the drain electrodes 72a and 72b, respectively. At the same time, a connection line 74 is formed to connect the drain electrode 72a of the driving TFT Ts with the source electrode 70b of the synchronization adjusting TFT Tc. A data line 76 is also formed of the same material as the source electrodes 70a and 70b and the drain electrodes 72a and 72b and is connected to the source electrode 70a of the driving TFT Ts.

A passivation layer 78 is formed on an entire surface of the substrate 60 including the source electrodes 70a and 70b and the drain electrodes 72a and 72b, and exposes the drain electrode 72b of the synchronization adjusting TFT Tc. A pixel electrode 80 is formed on the passivation layer 78 and is connected to the exposed drain electrode 72b.

In the above structure, the aperture ratio is reduced because the connection line 74 for connecting the driving TFT Ts and the synchronization adjusting TFT Tc still occupies a part of the aperture area.

Thus, in each of the related art substrates above, the pixel electrodes do not cover substantially all of the pixel regions.

Although not drawn to scale, between about 5-10% of the aperture area is lost due to the connection line being formed in the pixel region.

A vertical electric field mode LCD device is described in the first and second embodiments of the related art, and an in-plane switching (IPS) mode LCD device will be explained hereinafter with reference to FIGS. 8 to 10.

The IPS mode LCD device has a wider viewing angle than the vertical electric field mode LCD device of the first and second embodiments. However, since a common electrode and a pixel electrode are formed in one pixel, the IPS mode LCD device has a reduced aperture ratio.

FIG. 8 is a plan view showing an array substrate for an IPS mode LCD device of the related art.

As shown in FIG. 8, gate lines 94 are formed on a substrate 90 in a first direction and a data line 110 is formed in a second direction. The gate lines 94 and the data line 110 perpendicularly cross each other to define a first pixel region P1 and a second pixel region P2. A common line 96 is formed parallel to the gate lines 94, and traverses the first and second pixel regions P1 and P2.

A driving TFT Ts is formed in each pixel region P1 and P2 and a synchronization adjusting TFT Tc is formed in the first pixel region P1. The synchronization adjusting TFT Tc can be formed in one of the two pixel regions (the odd pixel region and the even pixel region, above) adjoining each other with respect to a single data line 110.

Pixel electrodes 114a and 114b are formed in the pixel regions P1 and P2, respectively. The pixel electrode 114a of the first pixel region P1 is connected to the synchronization adjusting TFT Tc and the pixel electrode 114b of the second pixel region P2 is connected to the driving TFT Ts. The pixel electrodes 114a and 114b are parallel to the data line 110. Additionally, a common electrode 98 is formed in each pixel region P1 and P2. The common electrode 98 includes a plurality of patterns, which are parallel to the pixel electrodes 114a and 114b and alternate with the pixel electrodes 114a and 114b in respective pixel regions P1 and P2.

A storage capacitor Cst is formed over the common line 96 in each pixel region P1 and P2. A part of the common line 96 functions as a first electrode and an extension part DL extending from each pixel electrode 114a and 114b acts as a second electrode of the storage capacitor Cst.

The adjacent pixel regions P1 and P2, left and right in the context of the figure, receive signals from the same data line 110. To sequentially transmit the signals, the synchronization adjusting TFT Tc is formed in one of the pixel regions P1 and P2 as stated above.

Therefore, a connection line 112 is formed in the first pixel region P1 to connect a drain electrode 108a of the driving TFT Ts with a source electrode 106b of the synchronization adjusting TFT Tc, and the aperture ratio is accordingly decreased.

FIGS. 9 and 10 show cross-sections of an array substrate for an IPS mode LCD device of the related art. FIG. 9 is a cross-sectional view along the line IX-IX of FIG. 8 and FIG. 10 is a cross-sectional view along the line X-X of FIG. 8.

As shown in FIGS. 9 and 10, pixel regions P1 and P2 are defined on a substrate 90. A synchronization adjusting TFT Tc is formed in one of the pixel regions P1 and P2, for example, in the pixel region P1.

More particularly, a gate electrode 92a for the driving TFT Ts and a gate electrode 92b for the synchronization adjusting TFT Tc are formed on the substrate 90. Although not shown in the figures, gate lines, a common line 96 and common electrodes 98 are formed of the same material in the same layer as the gate electrodes 92a and 92b. The gate lines are spaced apart from each other, and are connected to the gate electrodes 92a and 92b, respectively. The common line 96 is parallel to and spaced apart from the gate lines. As shown in FIG. 8, the common electrodes 98 vertically extend from the common line 96.

A gate insulating layer 100 is formed on the gate electrodes 92a and 92b, and active layers 102a and 102b and ohmic contact layers 104a and 104b are sequentially formed on the gate insulating layer 100 over the gate electrodes 92a and 92b.

Source electrodes 106a and 106b and drain electrodes 108a and 108b are formed on the ohmic contact layers 104a and 104b. The source electrodes 106a and 106b are spaced apart from the drain electrodes 108a and 108b, respectively. A data line 110 and a connection line 112 are formed of the same material in the same layer as the source electrodes 106a and 106b and the drain electrodes 108a and 108b. The data line 110 is connected to the source electrodes 106a and 106b and the connection line 112 is connected to the drain electrode 108a of the driving TFT Ts and the source electrode 106b of the synchronization adjusting TFT Tc in the pixel region P1.

Meanwhile, pixel electrodes 114a and 114b are formed in the pixel regions P1 and P2. Although not shown in FIGS. 9 and 10, the pixel electrode 114a of the pixel region P1 is connected to the synchronization adjusting TFT Tc and the pixel electrode 114b of the pixel region P2 is connected to the driving TFT Ts. The pixel electrodes 114a and 114b are parallel to and alternate the common electrodes 98.

However, as stated above, the connection line 112 is formed in the pixel region P1, thereby reducing the aperture ratio of the device.

SUMMARY OF THE INVENTION

A substrate includes first and second gate lines, a data line, first and second driving thin film transistors, a first synchronization adjusting thin film transistor, a first connection line, and first and second pixel electrodes. The first and second gate lines extend in a first direction and the data line extends in a second direction on the substrate. The first and second gate lines cross the data line to define adjacent first and second pixel regions. The first and second driving thin film transistors are formed in the first and second pixel regions, respectively. The first and second driving thin film transistors are connected to the data line. The first synchronization adjusting thin film transistor is formed in the first pixel region and is connected to the second gate line. The first connection line is connected to the first driving thin film transistor and the first synchronization adjusting thin film transistor. The first connection line overlaps a conductive line along a direction of extension of the conductive line. The first and second pixel electrodes are formed in the first and second pixel regions, respectively. The first pixel electrode is connected to the first synchronization adjusting thin film transistor and the second pixel electrode is connected to the second driving thin film transistor.

In another aspect invention, a method increases an aperture of a pixel region. Gate lines and data lines are formed on a substrate. A driving thin film transistor and a synchronization adjusting thin film transistor are formed in a pixel region. The driving thin film transistor and the synchronization adjusting thin film transistor are connected to different gate lines. The driving thin film transistor and the synchronization adjusting thin film transistor are connected through a connection line that overlaps a conductive line. The connection line extends in the direction of the conductive line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 15A to 15D are cross-sectional views showing a manufacturing method of the array substrate according to the second embodiment of the present invention and corresponding to the line XV-XV of FIG. 14;

DETAILED DESCRIPTION OF THE ILLUSTRATED EMBODIMENTS

Reference will now be made in detail to the illustrated embodiments of the present invention, which are illustrated in the accompanying drawings.

Figure 1:
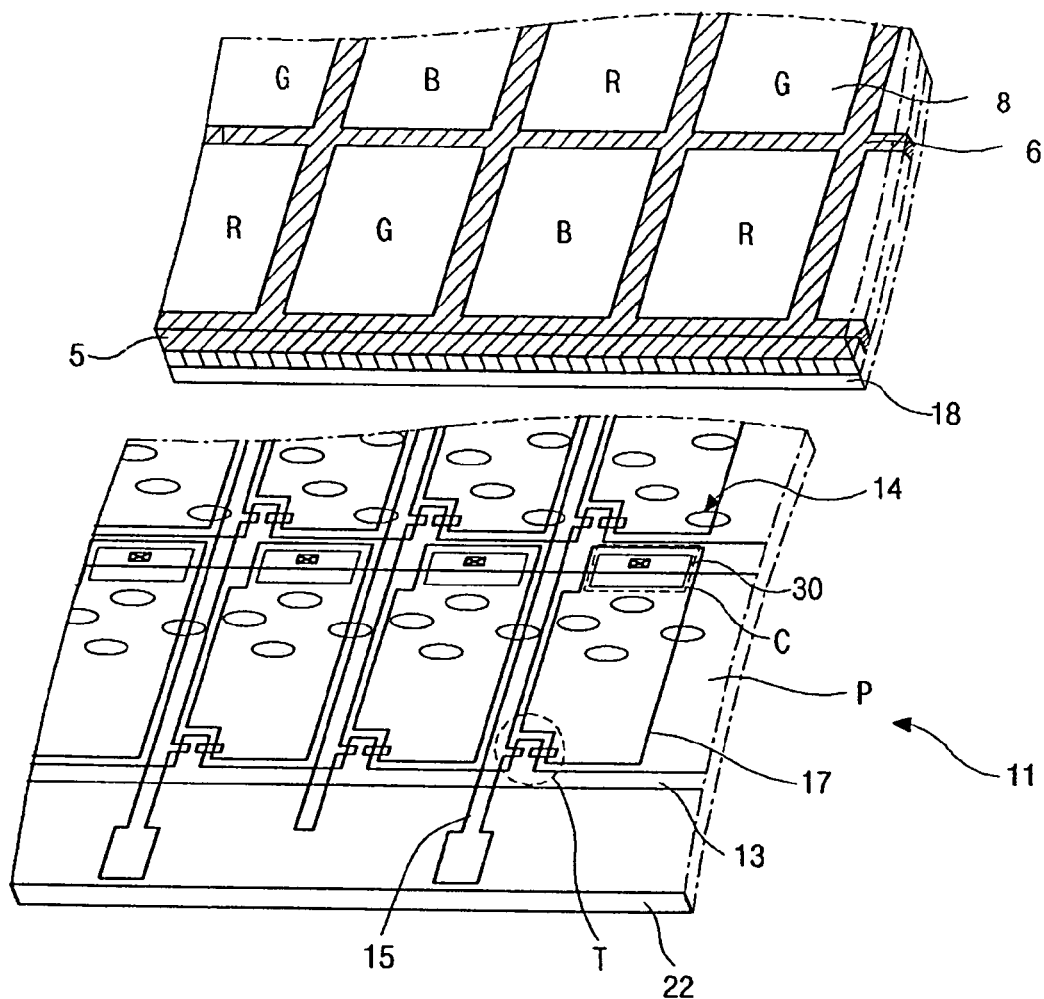
FIG. 1 is an exploded perspective view of a related art liquid crystal display device.
Figure 2:
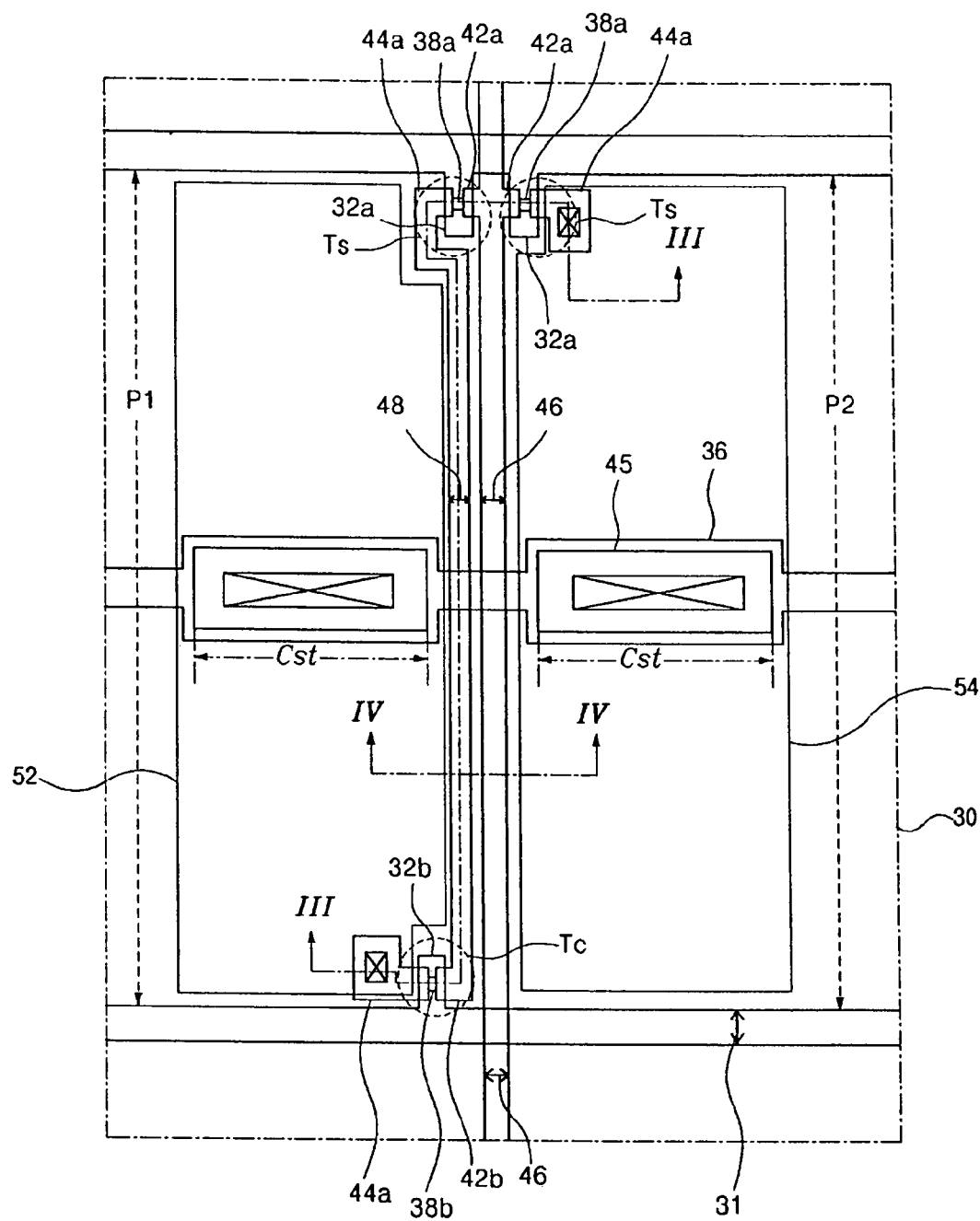
FIG. 2 is a plan view showing an array substrate for a liquid crystal display device according to a first embodiment of the related art.
Figure 3:
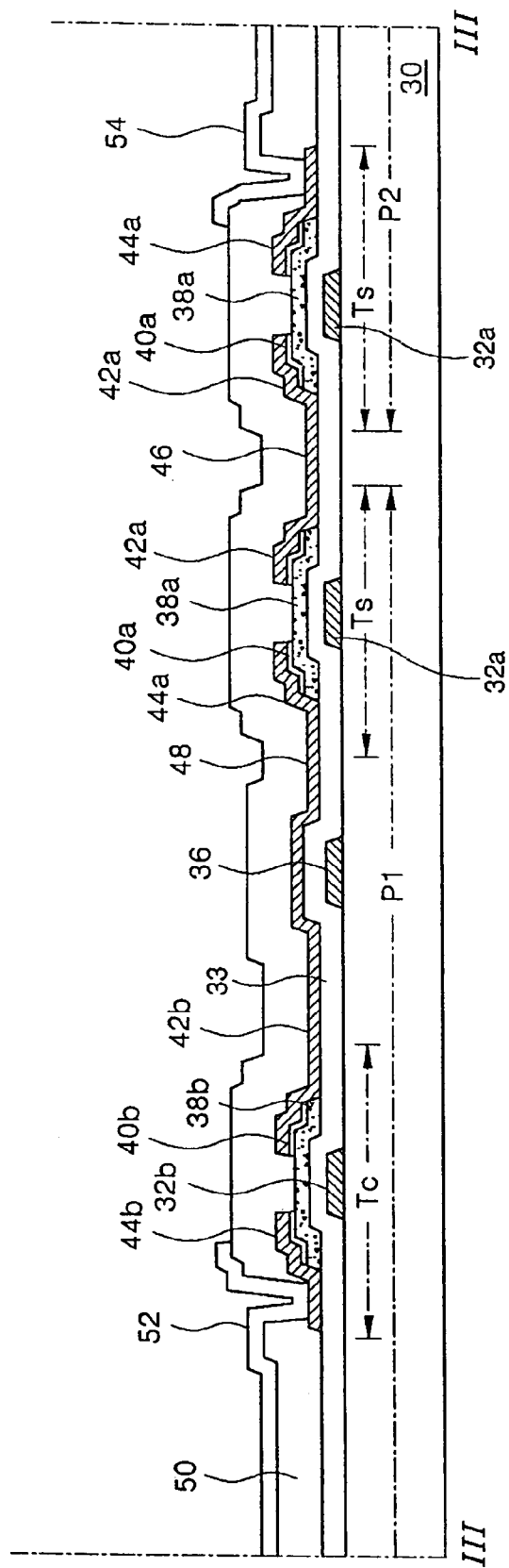
FIG. 3 is a cross-sectional view along the line III-III of FIG. 2.
Figure 4:
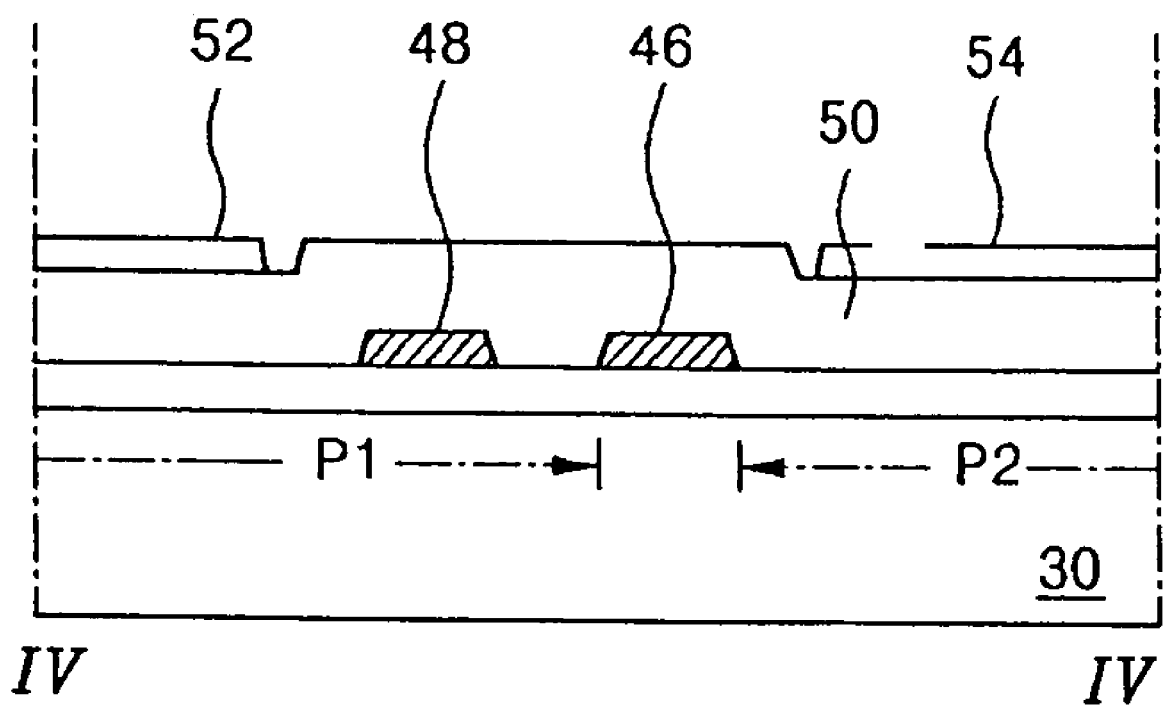
FIG. 4 is a cross-sectional view along the line IV-IV of FIG. 2.
Figure 5:
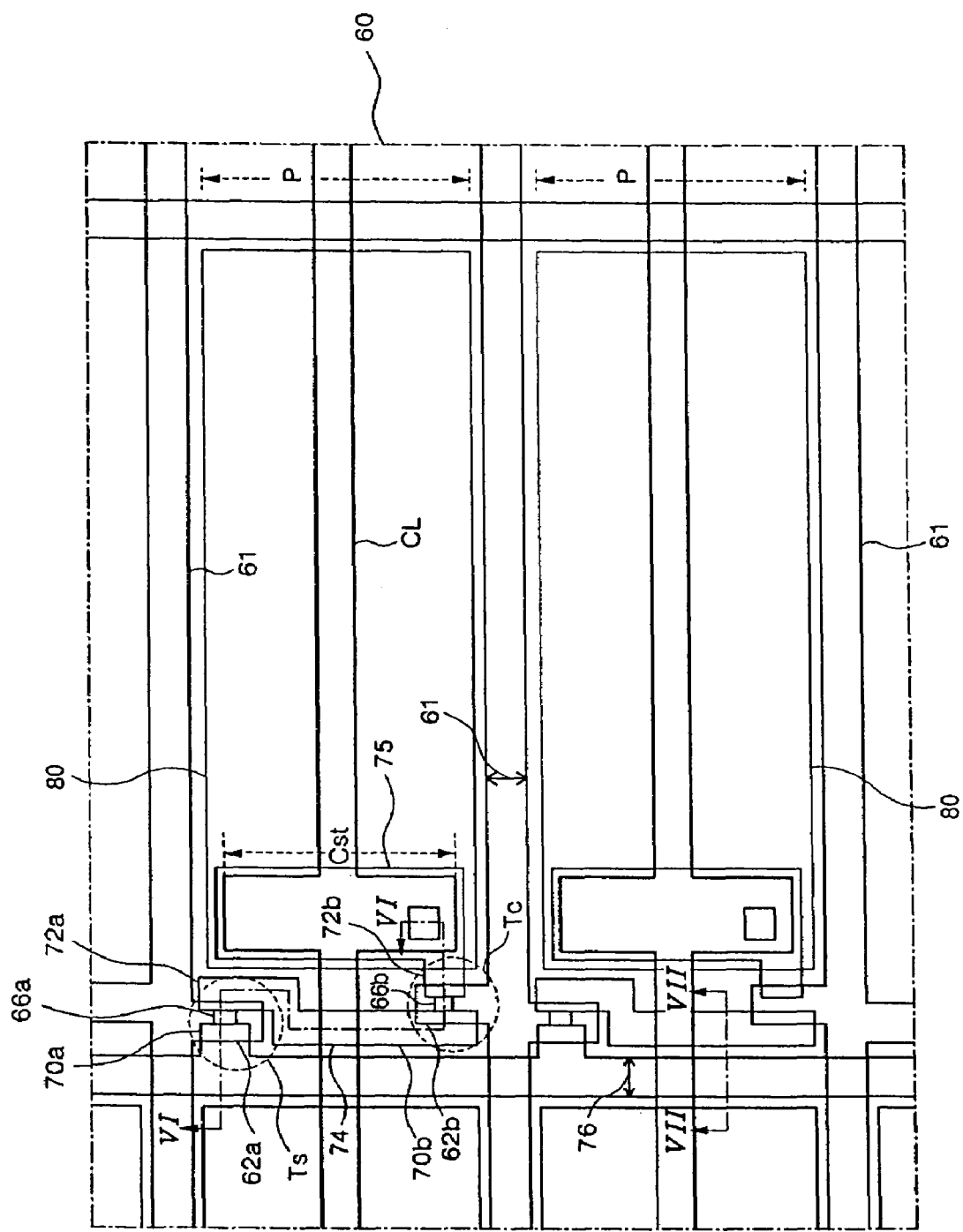
FIG. 5 is a plan view showing an array substrate for a liquid crystal display device according to a second embodiment of the related art.
Figure 6:
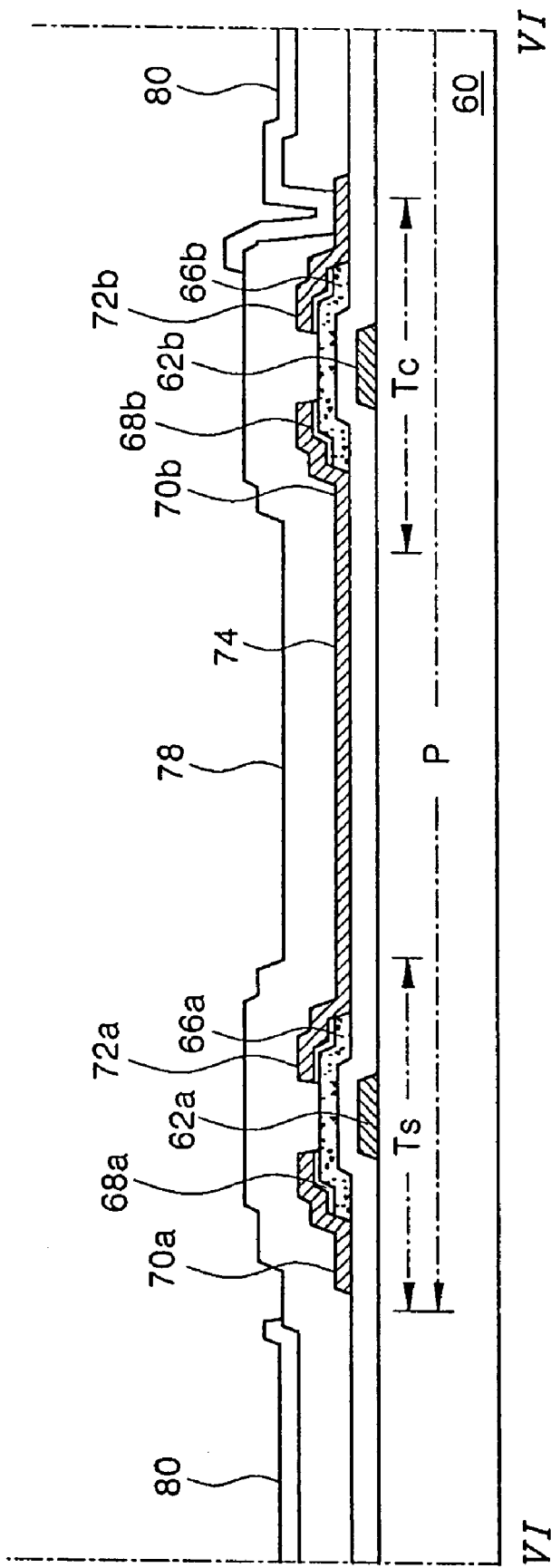
FIG. 6 is a cross-sectional view along the line VI-VI of FIG. 5.
Figure 7:
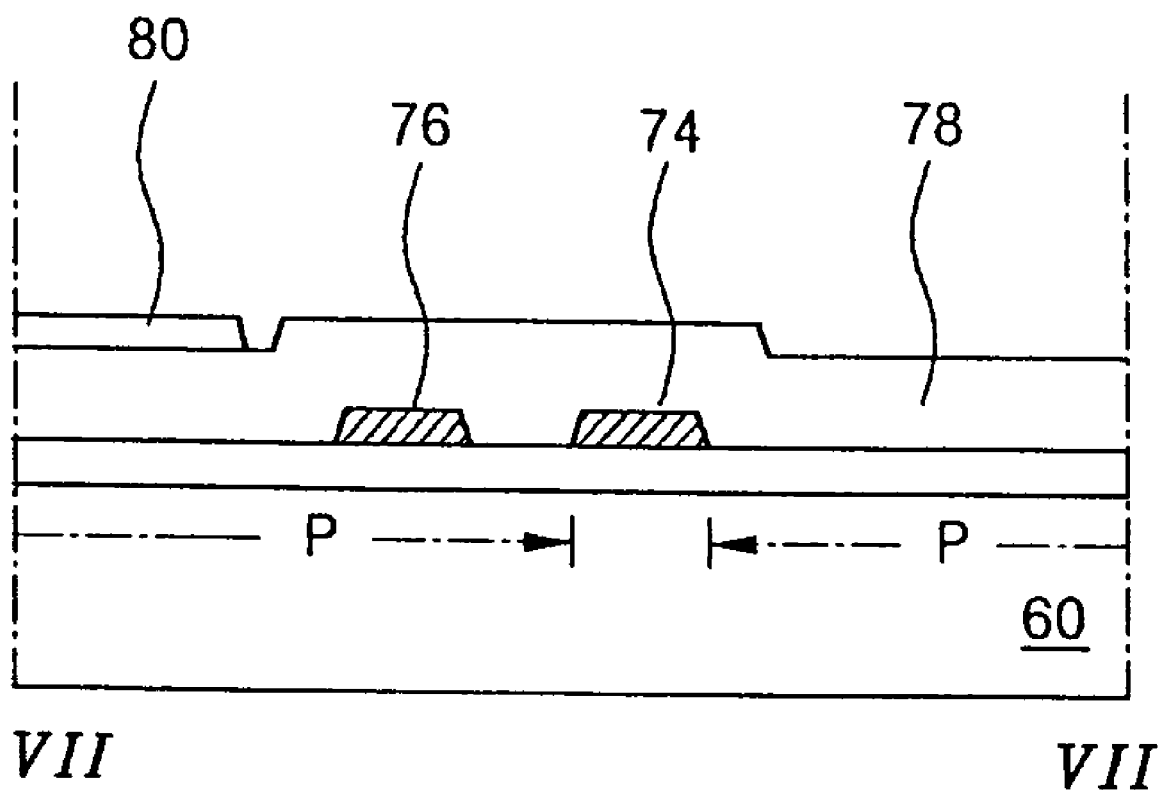
FIG. 7 is a cross-sectional view along the line VII-VII of FIG. 5.
Figure 8:
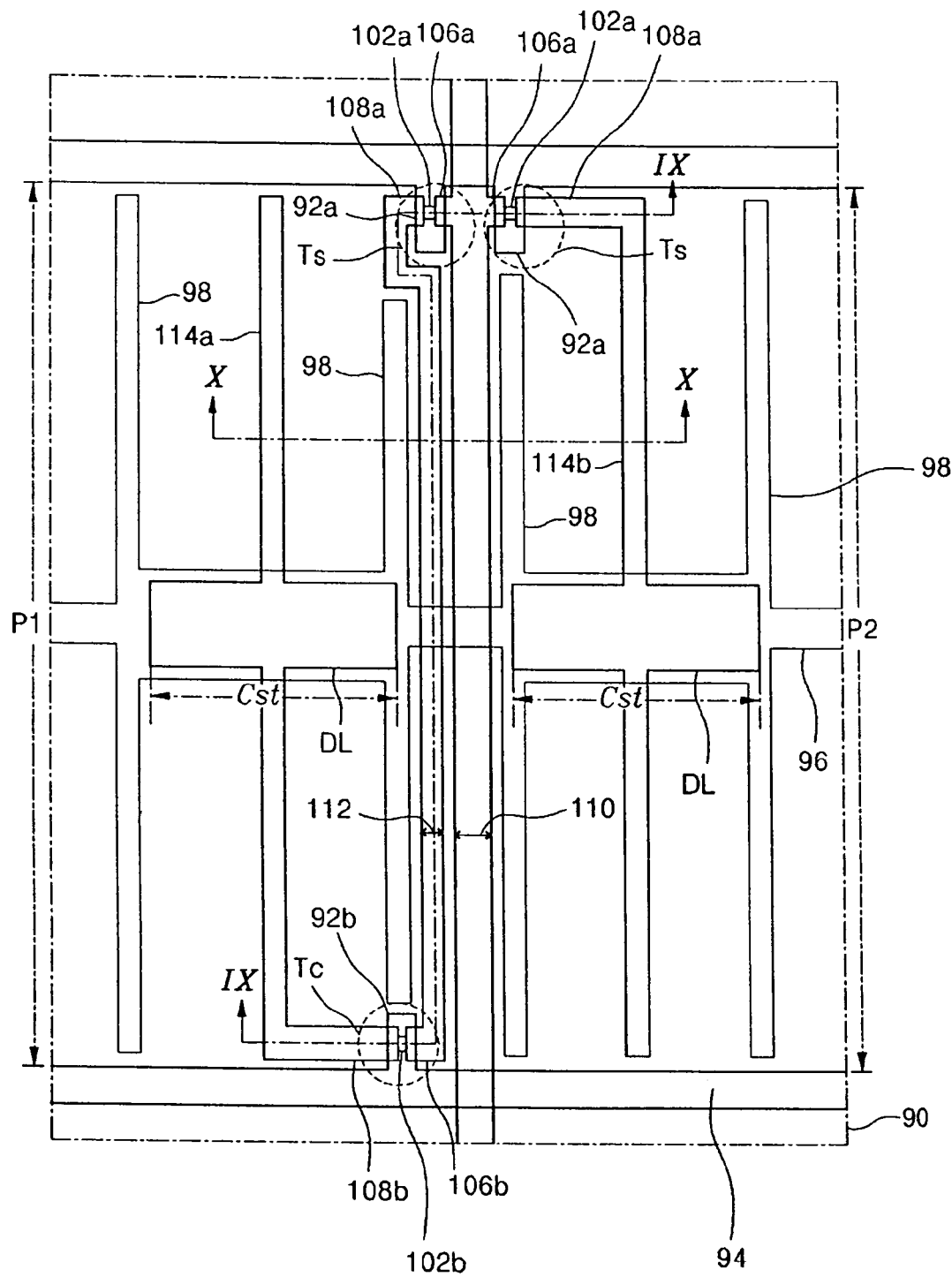
FIG. 8 is a plan view showing an array substrate for an in-plane switching mode liquid crystal display device of the related art.
Figure 9:
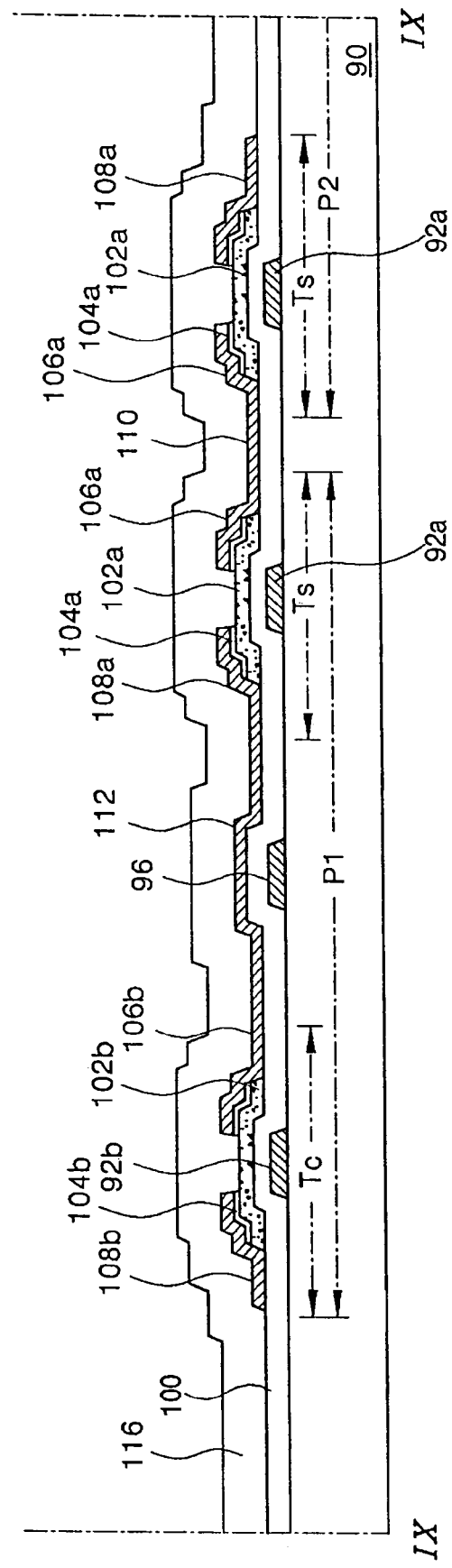
FIG. 9 is a cross-sectional view along the line IX-IX of FIG. 8.
Figure 10:
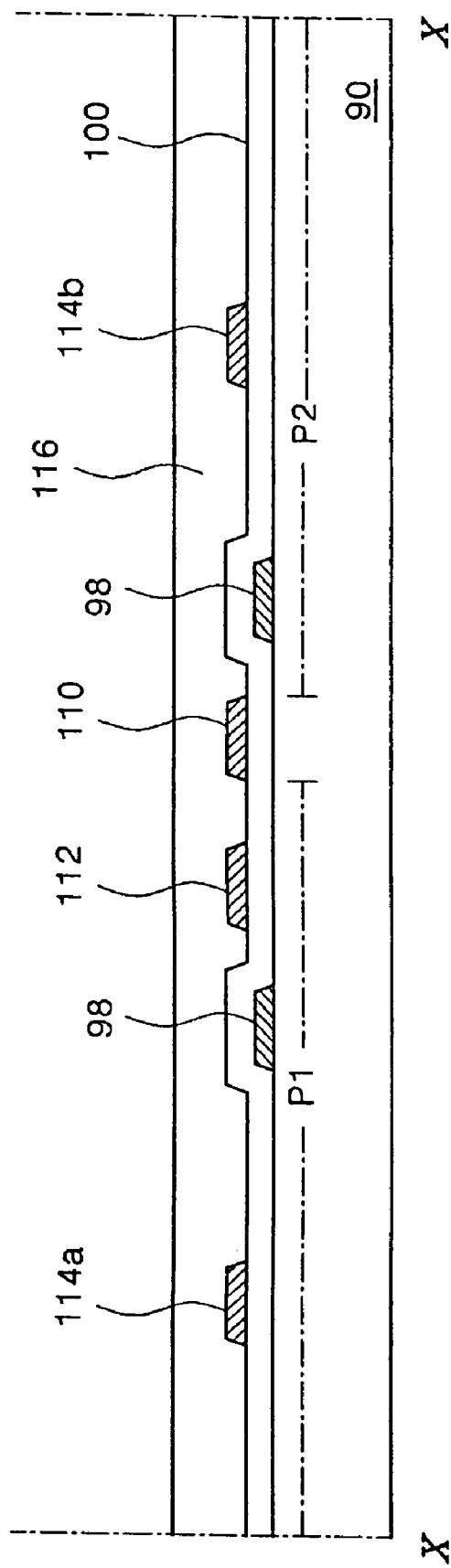
FIG. 10 is a cross-sectional view along the line X-X of FIG. 8.
Figure 11:
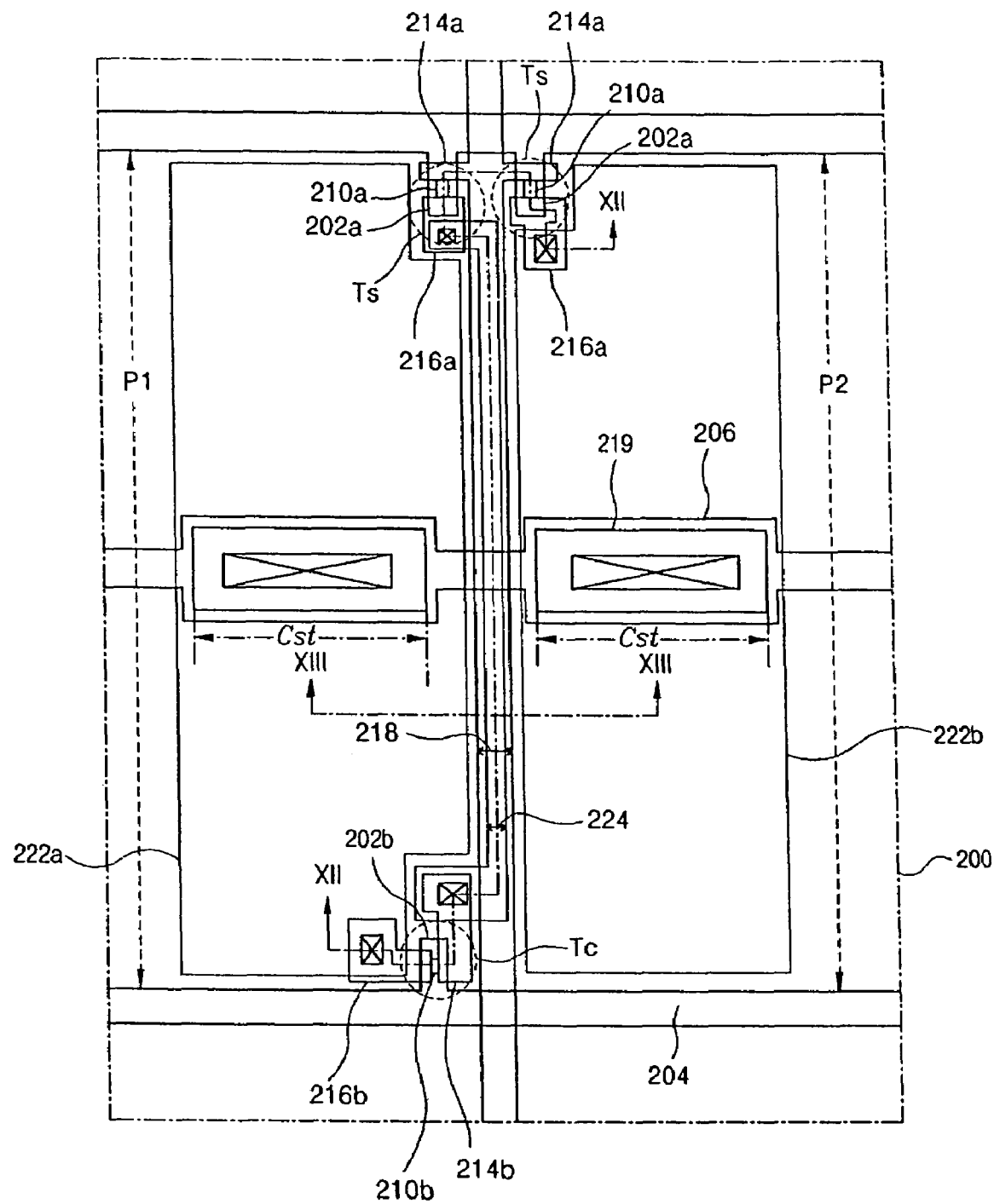
FIG. 11 is a plan view of an array substrate for a liquid crystal display device according to a first embodiment of the present invention.

FIG. 11 is a plan view of an array substrate for a liquid crystal display (LCD) device according to a first embodiment of the present invention. The LCD device of the first embodiment has a data line sharing structure that drives two pixels using one data line. In the first embodiment, a connection line for connecting a driving TFT and a synchronization adjusting TFT is formed of a transparent conductive material, and overlaps the data line. An organic passivation layer having a dielectric constant less than 3 is formed between the connection line and the data line.

As shown in FIG. 11, gate lines 204 are formed in a first direction on a substrate 200 and a data line 218 is formed in a second direction. The data line 218 perpendicularly crosses the gate lines 204 to define pixel regions P1 and P2 adjacent along the first direction, that is, left and right in the context of the figure. Transparent pixel electrodes 222a and 222b formed in the pixel regions P1 and P2, respectively, are substantially rectangular and cover substantially all of the pixel regions.

A driving TFT Ts is formed in each pixel region P1 and P2 and a synchronization adjusting TFT Tc is formed in the pixel region P1 to input signals from the driving TFT Ts to the pixel electrode 222a. The synchronization adjusting TFT Tc can be formed in one of the two pixel regions—either the odd pixel region or the even pixel region—adjoining each other with respect to the data line 218. Thus, the synchronization adjusting TFT Tc may be formed in the pixel region P2.

The driving TFTs Ts of the pixel regions P1 and P2 are connected to the same data line 218. Since different signals are transmitted through the data line 218, the synchronization adjusting TFT Tc is further formed to sequentially transmit the signals.

Each driving TFT Ts includes a gate electrode 202a, an active layer 210a, a source electrode 214a, and a drain electrode 216a. The synchronization adjusting TFT Tc includes a gate electrode 202b, an active layer 210b, a source electrode 214b, and a drain electrode 216b.

A common line 206 is formed parallel to and spaced apart from the gate lines 204, and traverses the pixel regions P1 and P2 adjacent left and right in the context of the figure. A metal pattern 219 is formed over the common line 206 in each pixel region P1 and P2. The metal pattern 219 is connected to each pixel electrode 222a and 222b. Thus, a storage capacitor Cst is formed in each pixel region P1 and P2. The common line 206 functions as a first electrode and the metal pattern 219 acts as a second electrode of the storage capacitor Cst.

In the pixel region P1 where the driving TFT Ts and the synchronization adjusting TFT Tc are formed, the driving TFT Ts and the synchronization adjusting TFT Tc are connected to adjacent gate lines 204, respectively, and thus are spaced apart from each other. Accordingly, a connection line 224 connects the driving TFT Ts and the synchronization adjusting TFT Tc.

Here, the connection line 224 is formed of the same material in the same layer as the pixel electrodes 222a and 222b. The connection line 224 is disposed over the data line 218, and overlaps the data line 218. An organic passivation layer (not shown) is formed between the data line 218 and the connection line 224. The organic passivation layer has a dielectric constant less than 3 and is relatively thick. Therefore, signal interference between the connection line 224 and the data line 218 can be prevented if the capacitance, which is essentially proportional to the dielectric constant divided by the thickness, is limited.

In the first embodiment of the present invention, because the connection line is formed over the data line, the aperture ratio of the LCD device is increased, and brightness in the adjacent pixel regions with respect to the data line is uniform to improve qualities of the displayed images.

FIGS. 12A to 12D and FIGS. 13A to 13D show a manufacturing method of the array substrate according to the first embodiment of the present invention. FIGS. 12A to 12D are cross-sectional views corresponding to the line XII-XII of FIG. 11 and FIGS. 13A to 13D are cross-sectional views corresponding to the line XIII-XIII of FIG. 11.

Figure 12A:
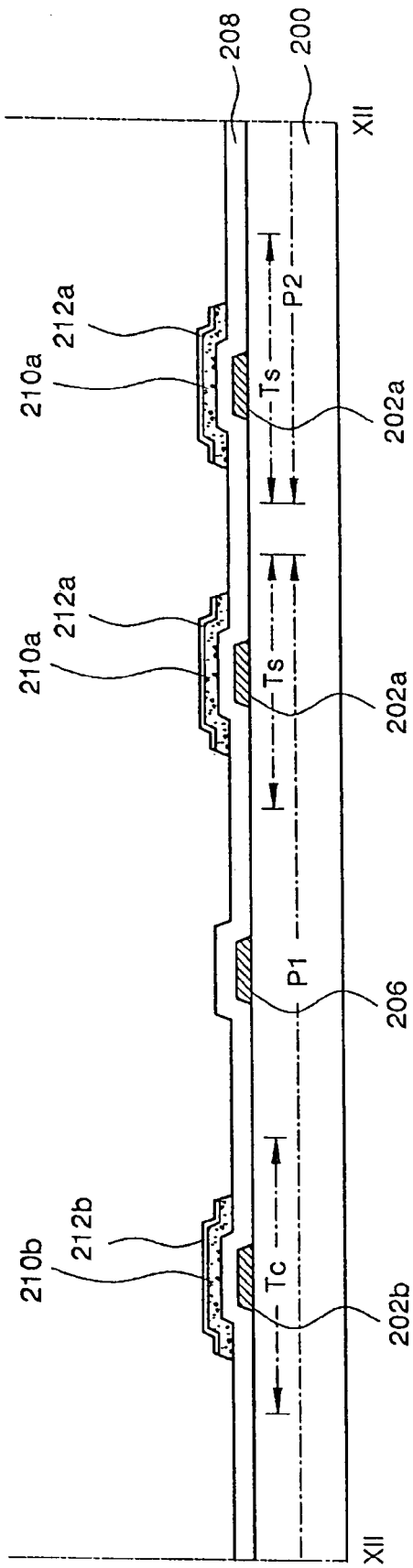
FIGS. 12A to 12D are cross-sectional views showing a manufacturing method of the array substrate according to the first embodiment of the present invention and corresponding to the line XII-XII of FIG. 11.
Figure 12A:
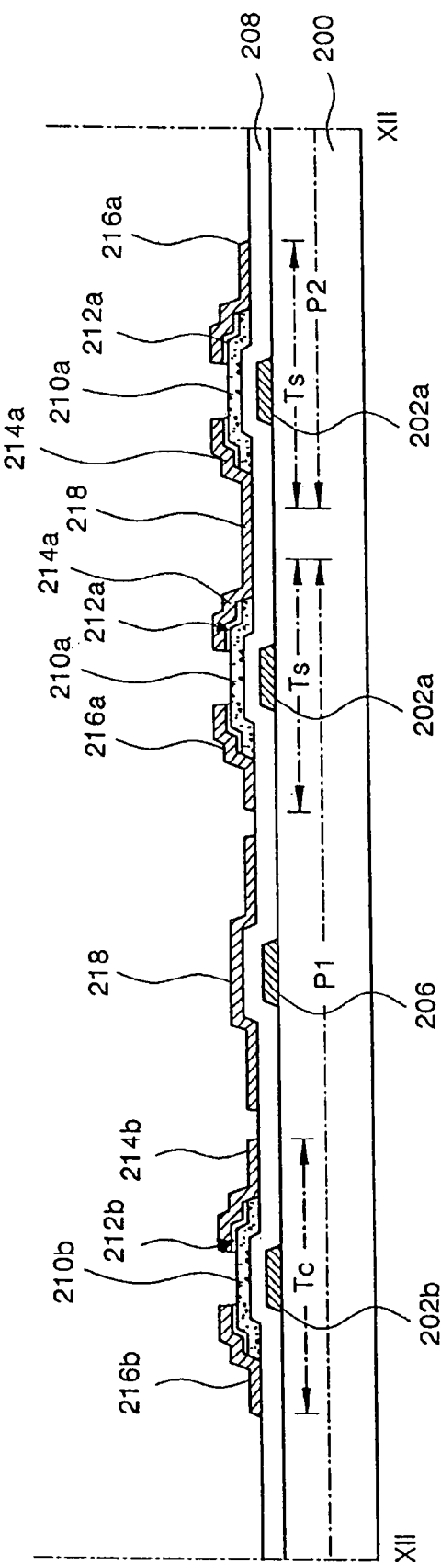
Figure 13A:
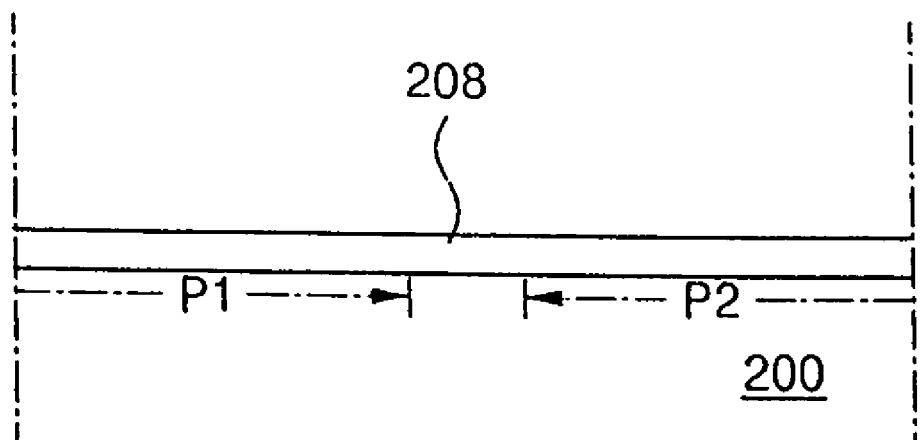
FIGS. 13A to 13D are cross-sectional views showing a manufacturing method of the array substrate according to the first embodiment of the present invention and corresponding to the line XIII-XIII of FIG. 11.

As shown in FIGS. 12A and 13A, pixel regions P1 and P2 are defined on a substrate 200. A region for a driving TFT Ts is formed in each pixel region P1 and P2, and a region for a synchronization adjusting TFT Tc is formed in the pixel region P1. As stated above, the synchronization adjusting TFT Tc may be formed in the pixel region P2.

Gate electrodes 202a and 202b, gate lines 204 of FIG. 11, and a common line 206 are formed on the substrate 200 by depositing aluminum or an aluminum alloy and then patterning it. The gate electrodes 202a correspond to the regions for the driving TFTs Ts and the gate electrode 202b corresponds to the region for the synchronization adjusting TFT Tc. The gate lines 204 of FIG. 11 are connected to the gate electrodes 202a and 202b, respectively. That is, one gate line 204 of FIG. 11 is connected to the gate electrodes 202a in the region for the driving TFTs Ts, and another gate line 204 of FIG. 11 is connected to the gate electrode 202b in the region for the synchronization adjusting TFT Tc. Thus, the gate electrode 202a in the region for the driving TFT Ts and the gate electrode 202b in the region for the synchronization adjusting TFT Tc are connected to different gate lines. The common line 206 is parallel to and spaced apart from the gate lines 204 of FIG. 11.

A gate insulating layer 208 is formed on an entire surface of the substrate 200 including the gate electrodes 202a and 202b, the gate lines 204 of FIG. 11 and the common line 206 by depositing an inorganic insulating material such as silicon nitride ($SiN_x$) or silicon oxide ($SiO_2$).

Next, active layers 210a and 210b and ohmic contact layers 212a and 212b are formed on the gate insulating layer 208 by depositing intrinsic amorphous silicon (a-Si:H) and impurity-doped amorphous silicon (n+ or p+ a-Si:H) and then patterning them. Intrinsic Si is unintentionally doped Si, usually doped less than about $10^{15}$ $cm^{-3}$, while n+ or p+ impurity-doped amorphous silicon is usually doped more than about $10^{18}$ $cm^{-3}$. The active layers 210a and the ohmic contact layers 212a are disposed over the gate electrodes 202a in the regions for the driving TFTs Ts, and the active layer 210b and the ohmic contact layer 212b are disposed over the gate electrode 202b in the region for the synchronization adjusting TFT Tc.

Figures 12B, 12C:
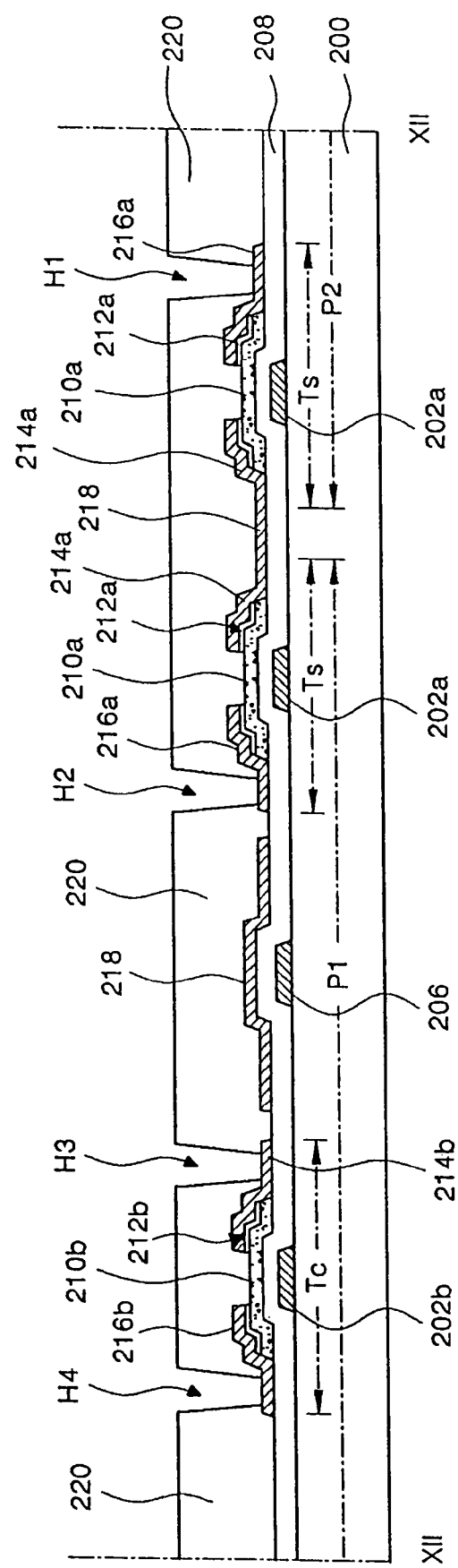
Figure 13B:
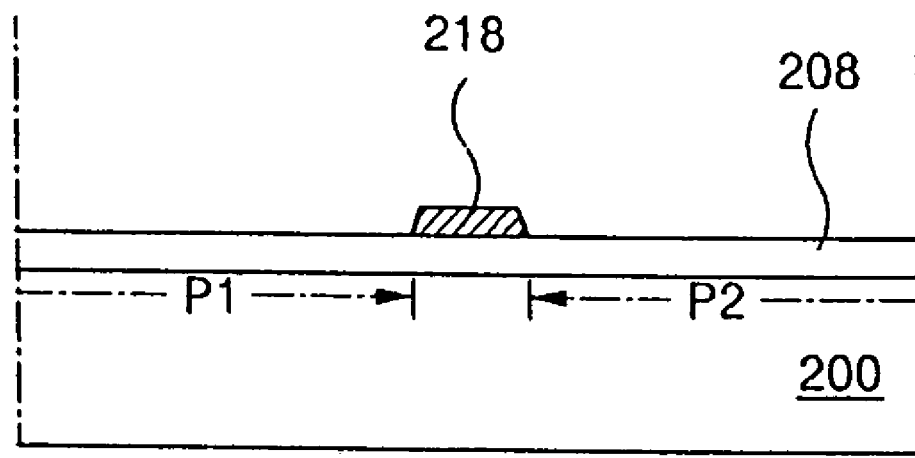

As shown in FIGS. 12B and 13B, source electrodes 214a and 214b and drain electrodes 216a and 216b are formed on the ohmic contact layers 212a and 212b by depositing a metal material on the substrate 200 including the ohmic contact layers 212a and 212b thereon and then patterning the metal material. The metal material may be selected from a metal group including chromium (Cr), molybdenum (Mo), tungsten (W), tantalum (Ta), copper (Cu), and so on. The source electrode 214a and the drain electrode 216a are disposed on and contact the ohmic contact layer 212a in each region for the driving TFT Ts and are spaced apart from each other. The source electrode 214b and the drain electrode 216b are disposed on and contact the ohmic contact layer 212b in the region for the synchronization adjusting TFT Tc. At the same time, a data line 218 is formed on the gate insulating layer 208. The data line 218 is connected to the source electrodes 214a of the pixel regions P1 and P2.

Figure 13C:
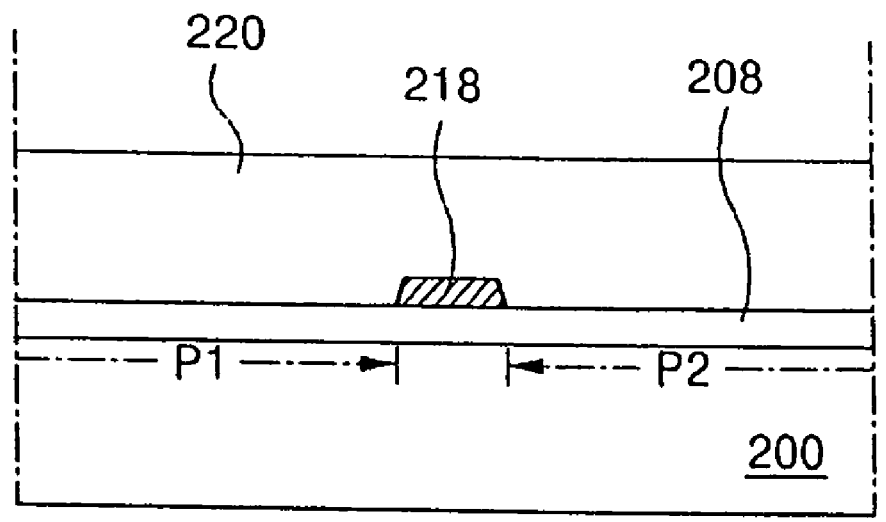

As shown in FIGS. 12C and 13C, a passivation layer 220 is formed on an entire surface of the substrate 200 including the source electrodes 214a and 214b and the drain electrodes 216a and 216b by coating an organic insulating material having a dielectric constant less than 3 such as benzocyclobutene (BCB) or acrylic resin.

Subsequently, the passivation layer 220 is patterned to form first, second, third and fourth contact holes H1, H2, H3 and H4. The first contact hole Hi exposes the drain electrode 216a in the region for the driving TFT Ts of the pixel region P2, the second contact hole H2 exposes the drain electrode 216a in the region for the driving TFT Ts of the pixel region P1, the third contact hole H3 exposes the source electrode 214b in the region for the synchronization adjusting TFT Tc of the pixel region P1, and the fourth contact hole H4 exposes the drain electrode 216b in the region for the synchronization adjusting TFT Tc of the pixel region P1.

Figure 12D:
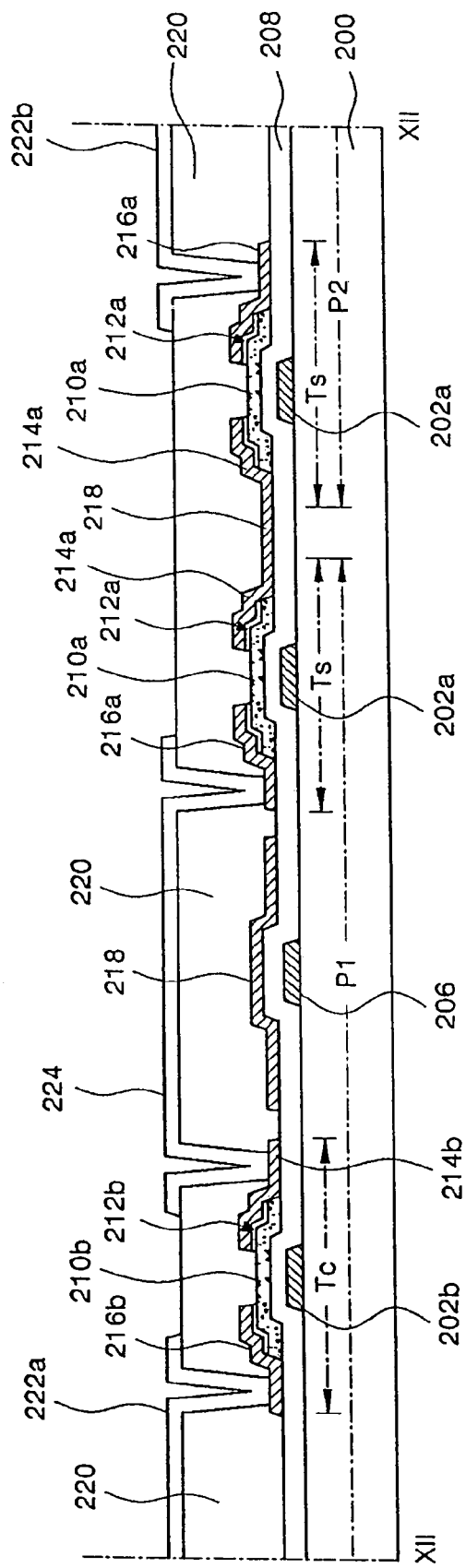
Figure 13D:
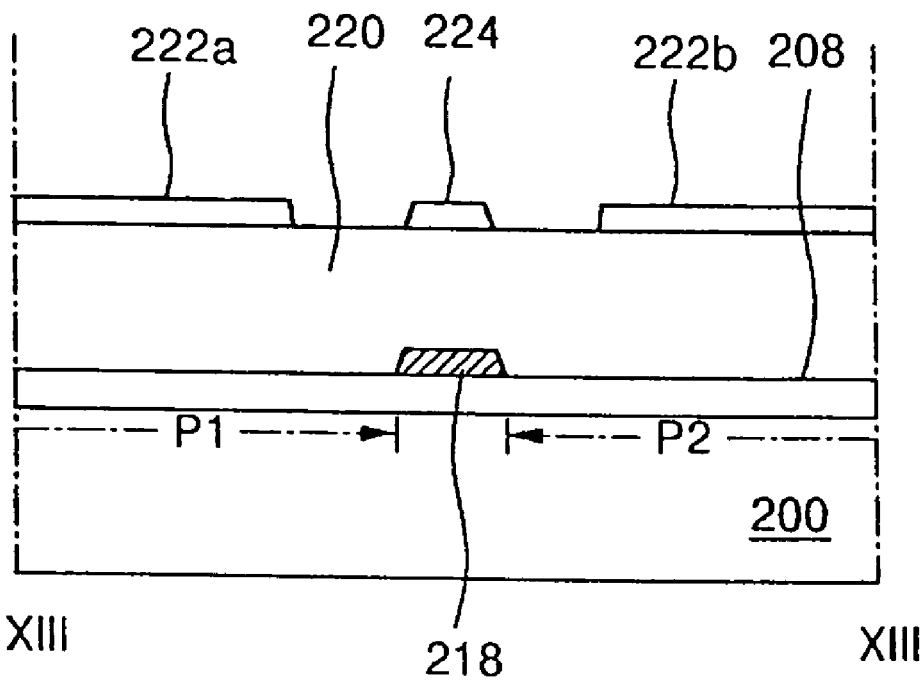

As shown in FIGS. 12D and 13D, pixel electrodes 222a and 222b are formed on the passivation layer 220 in the pixel regions P1 and P2 by depositing a transparent conductive material such as indium tin oxide (ITO) and indium zinc oxide (IZO) on an entire surface of the substrate 200 including the passivation layer 220 and then pattering the transparent conductive material. The pixel electrode 222a in the pixel region P1 is connected to the drain electrode 216b in the region for the synchronization adjusting TFT Tc of the pixel region P1 through the fourth contact hole H4, and the pixel electrode 222b in the pixel region P2 is connected to the drain electrode 216a in the region for the driving TFT Ts of the pixel region P2 through the first contact hole H1.

At this time, a connection line 224 is also formed of the same material as the pixel electrodes 222a and 222b on the passivation layer 220. The connection line 224 is connected to the source electrode 214b in the region for the synchronization adjusting TFT Tc of the pixel region P1 and the drain electrode 216a in the region for the driving TFT Ts of the pixel region P1. The connection line 224 is disposed over and overlaps the data line 218.

The array substrate for the LCD device according to the first embodiment of the present invention is manufactured through the above-mentioned processes.

Figure 14:
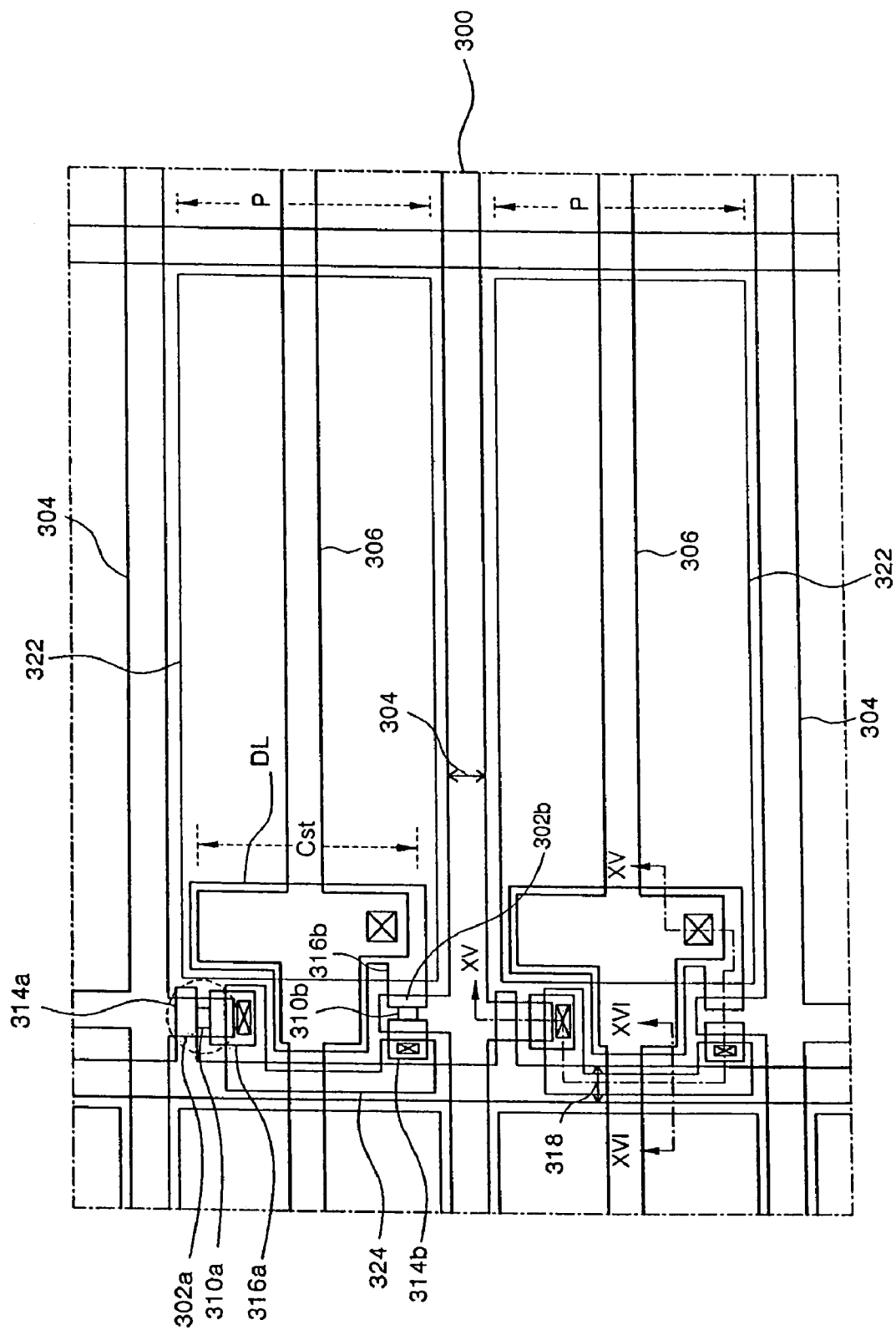
FIG. 14 is a plan view of an array substrate for a liquid crystal display device according to a second embodiment of the present invention.

FIG. 14 is a plan view of an array substrate for a liquid crystal display (LCD) device according to a second embodiment of the present invention. The LCD device of the second embodiment has a gate line sharing structure that drives two pixels using one gate line. In the second embodiment, a connection line for connecting a driving TFT and a synchronization adjusting TFT is formed of a transparent conductive material, and overlaps the data line. As above, a relatively thick organic passivation layer having a dielectric constant less than 3 is formed between the connection line and the data line.

As shown in FIG. 14, gate lines 304 are formed in a first direction on a substrate 300 and data lines 318 are formed in a second direction. The data lines 318 perpendicularly cross the gate lines 304 to define a plurality of pixel regions P.

A driving TFT Ts and a synchronization adjusting TFT Tc are formed in each pixel region P. The driving TFT Ts includes a gate electrode 302a, an active layer 310a over the gate electrode 302a, and source and drain electrodes 3 14a and 316a spaced apart from each other over the active layer 310a. The synchronization adjusting TFT Tc includes a gate electrode 302b, an active layer 304b over the gate electrode 302b, and source and drain electrodes 314b and 316b spaced apart from each other over the active layer 310b. Additionally, a substantially rectangular transparent pixel electrode 322 formed in each pixel region P covers substantially all of the pixel region.

The drain electrode 316a of the driving TFT Ts is connected to the source electrode 314b of the synchronization adjusting TFT Tc through a connection line 324, and the drain electrode 316b of the synchronization adjusting TFT Tc is connected to the pixel electrode 322.

In the second embodiment of the present invention, adjacent pixel regions P up and down in the context of the figure commonly own one gate line 304 and receive signals. Therefore, to sequentially apply the signals to the pixels, the driving TFT Ts and the synchronization adjusting TFT Tc are formed in each pixel region P. The driving TFT Ts and the synchronization adjusting TFT Tc in the same pixel region P are connected to different gate lines 304.

A common line 306 is also formed in each pixel region P. The common line 306 is spaced apart from and parallel to the gate lines 304.

A storage capacitor Cst is formed over the common line 306. A part of the common line 306 functions as a first electrode and an extension part DL extending from the drain electrode 316b of the synchronization adjusting TFT Tc, which overlaps the part of the common line 306, acts as a second electrode of the storage capacitor Cst.

Here, the connection line 324, which connects the drain electrode 316a of the driving TFT Ts with the source electrode 314b of the synchronization adjusting TFT Tc, is formed of the same material in the same layer as the pixel electrode 322, that is, a transparent conductive material. The connection line 324 is disposed over an adjacent data line 318 parallel, and overlaps the adjacent data line 318.

An organic passivation layer (not shown) is formed between the data line 318 and the connection line 324. The organic passivation layer may be formed of an organic insulating material having a dielectric constant less than 3. Therefore, signal interference between the connection line 324 and the data line 318 can be prevented as above.

In the second embodiment of the present invention, because the connection line 324 is not disposed in the pixel region P, the aperture ratio of the device is improved. Additionally, the storage capacitor Cst can be formed in a portion where the connection line of the related art is formed, and thus the capacitance of the storage capacitor Cst is increased.

FIGS. 15A to 15D and FIGS. 16A to 16D show a manufacturing method of the array substrate having the gate line sharing structure according to the second embodiment of the present invention. FIGS. 15A to 15D are cross-sectional views corresponding to the line XV-XV of FIG. 14 and FIGS. 16A to 16D are cross-sectional views corresponding to the line XVI-XVI of FIG. 14.

Figure 15C:
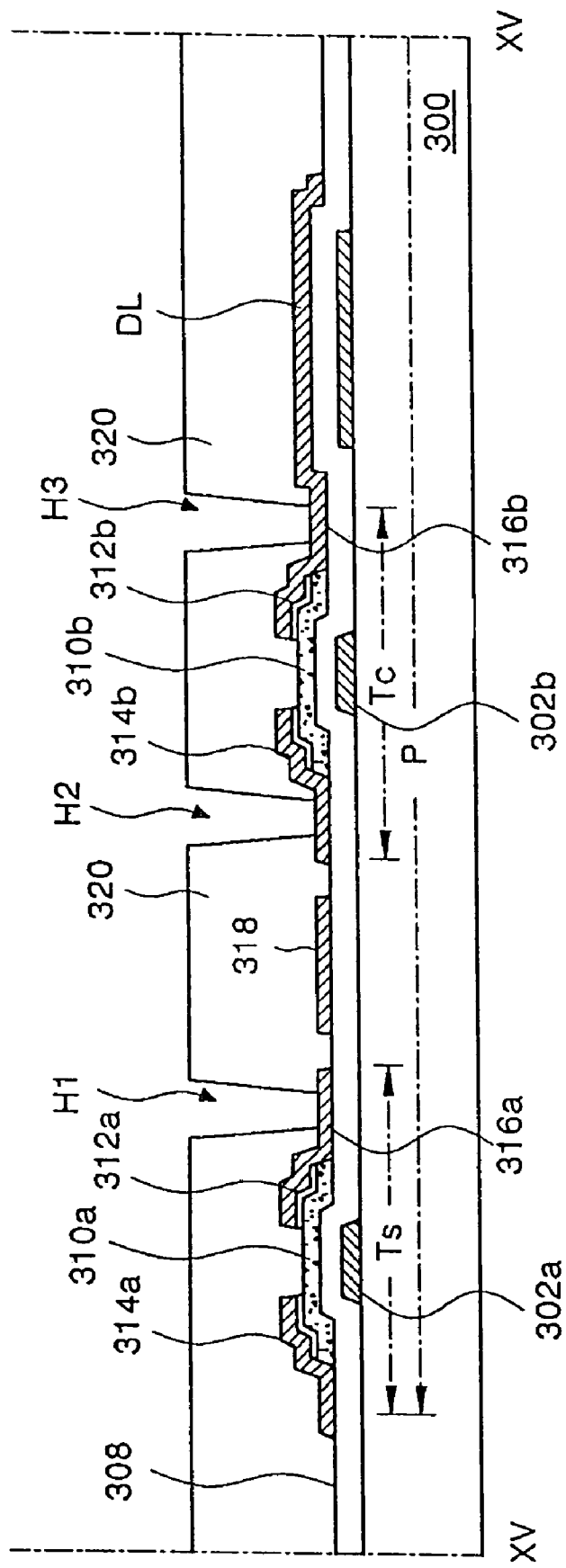
Figure 16A:
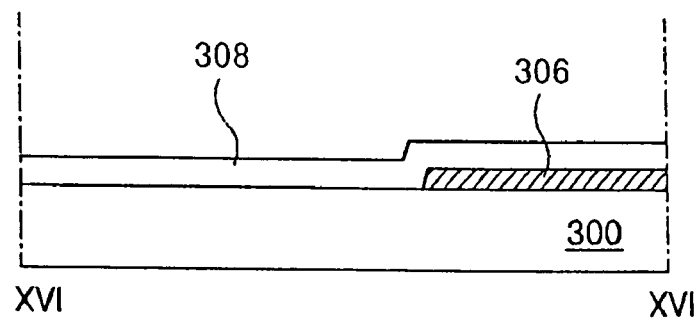
FIGS. 16A to 16D are cross-sectional views showing a manufacturing method of the array substrate according to the second embodiment of the present invention and corresponding to the line XVI-XVI of FIG. 14.

As shown in FIGS. 15A and 16A, pixel regions P are defined on a substrate 300. A region for a driving TFT Ts and a region for a synchronization adjusting TFT Tc are defined in the pixel region P.

Gate electrodes 302a and 302b, gate lines 304 of FIG. 14, and common lines 306 are formed on the substrate 300 by depositing aluminum or an aluminum alloy and then patterning it. The gate electrodes 302a correspond to the regions for the driving TFTs Ts and the gate electrode 302b corresponds to the region for the synchronization adjusting TFT Tc. Each gate line 304 of FIG. 14 is connected to the gate electrodes 302a and 302b, which the gate electrodes 302a and the 302b are disposed in adjacent pixel regions P. The common lines 306 are parallel to and spaced apart from the gate lines 304 of FIG. 14.

At this time, the gate electrodes 302a in the region for the driving TFT Ts and the gate electrode 302b in the region for the synchronization adjusting TFT Tc are connected to different gate lines 304.

A gate insulating layer 308 is formed on an entire surface of the substrate 300 including the gate electrodes 302a and 302b, the gate lines 304 of FIG. 11 and the common lines 306 by depositing an inorganic insulating material such as silicon nitride ($SiN_x$) or silicon oxide ($SiO_2$).

Next, active layers 310a and 310b and ohmic contact layers 3 12a and 312b are formed on the gate insulating layer 308 by depositing intrinsic amorphous silicon (a-Si:H) and impurity-doped amorphous silicon (n+ or p+ a-Si:H) on an entire surface of the substrate 300 including the gate insulating layer 308 thereon and then patterning them. The active layer 310a and the ohmic contact layer 312a are disposed over the gate electrode 302a in the region for the driving TFT Ts, and the active layer 310b and the ohmic contact layer 312b are disposed over the gate electrode 302b in the region for the synchronization adjusting TFT Tc.

Figure 16B:
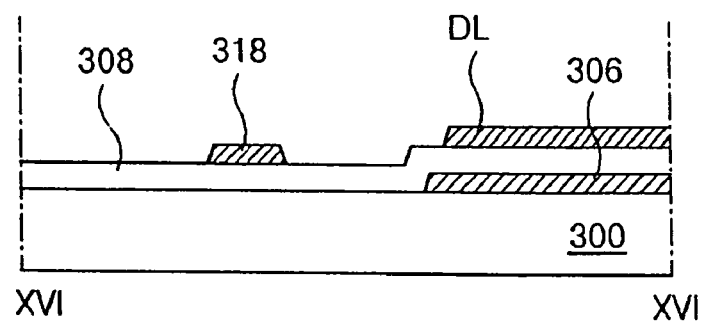

As shown in FIGS. 15B and 16B, source electrodes 314a and 314b and drain electrodes 316a and 316b are formed on the ohmic contact layers 312a and 312b by depositing a metal material on the substrate 300 including the ohmic contact layers 312a and 312b thereon and then patterning the metal material. The metal material may be selected from a metal group including chromium (Cr), molybdenum (Mo), tungsten (W), tantalum (Ta), copper (Cu), and so on. The source electrode 314a and the drain electrode 316a are disposed on and contact the ohmic contact layer 312a in the region for the driving TFT Ts and are spaced apart from each other. The source electrode 314b and the drain electrode 316b are disposed on and contact the ohmic contact layer 312b in the region for the synchronization adjusting TFT Tc. At the same time, a data line 318 and an extension part DL are formed on the gate insulating layer 308. The data line 318 is connected to the source electrode 314a in the region for the driving TFT Ts. The extension part DL extends from the drain electrode 316b in the region for the synchronization adjusting TFT Tc and overlaps the common line 306 in the pixel region P.

Figure 16C:
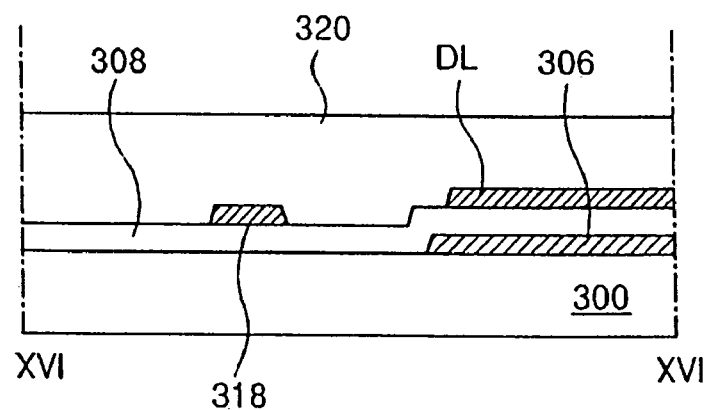

As shown in FIGS. 15C and 16C, a passivation layer 320 is formed on an entire surface of the substrate 300 including the source electrodes 314a and 314b and the drain electrodes 316a and 316b by coating an organic insulating material having a dielectric constant less than 3 such as benzocyclobutene (BCB) or acrylic resin.

Subsequently, the passivation layer 320 is patterned to form first, second and third contact holes H1, H2 and H3.

The first contact hole H1 exposes the drain electrode 316a in the region for the driving TFT Ts, the second contact hole H2 exposes the source electrode 314b in the region for the synchronization adjusting TFT Tc, and the third contact hole H3 exposes the drain electrode 316b in the region for the synchronization adjusting TFT Tc.

Figure 15D:
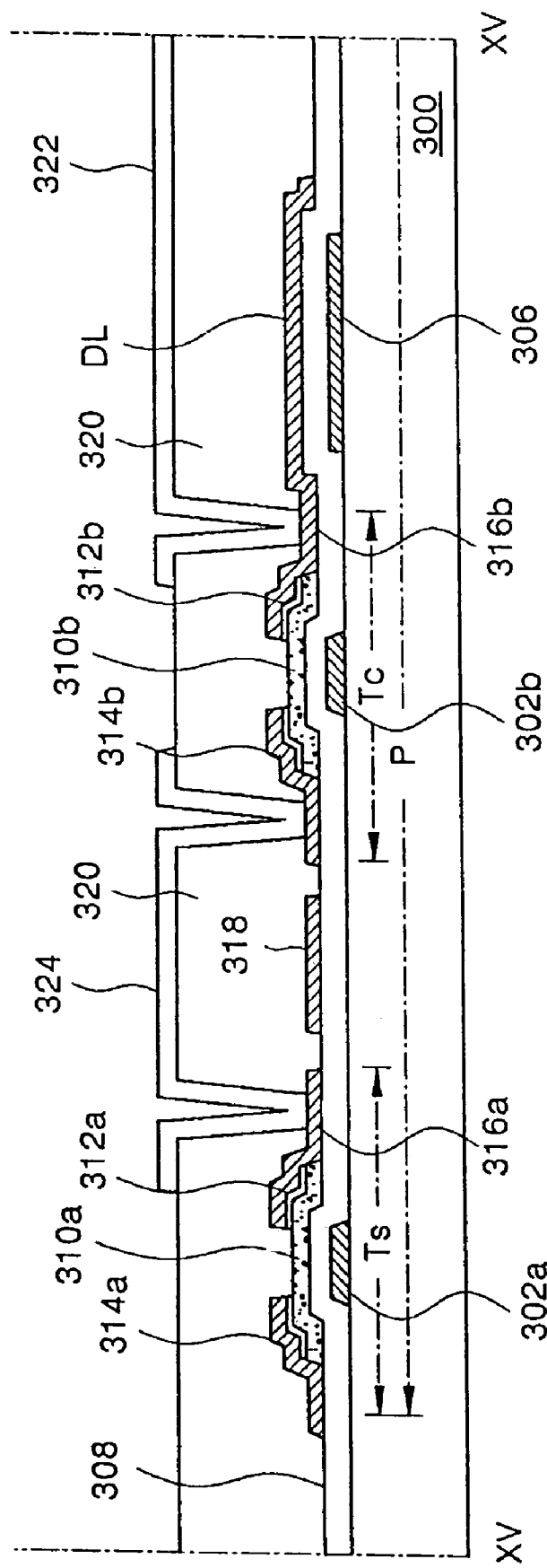
Figure 16D:
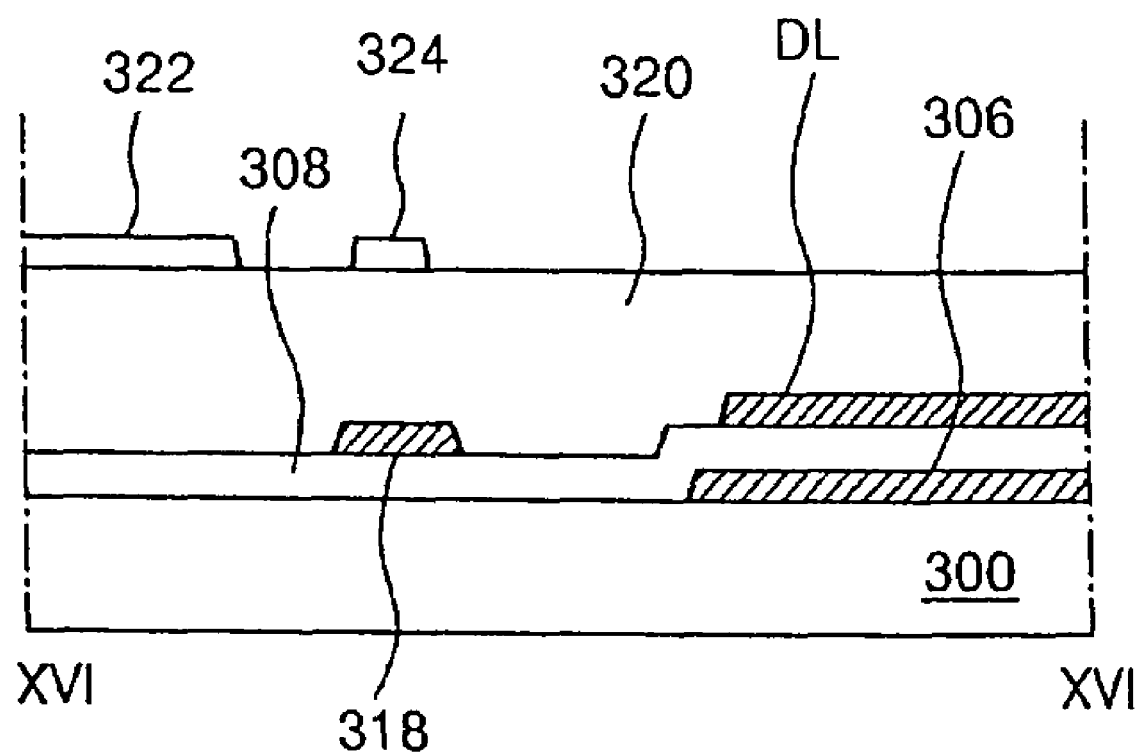

As shown in FIGS. 15D and 16D, a pixel electrode 322 is formed on the passivation layer 320 by depositing a transparent conductive material such as indium tin oxide (ITO) and indium zinc oxide (IZO) on an entire surface of the substrate 300 including the passivation layer 320 and then patterning the transparent conductive material. The pixel electrode 322 is connected to the drain electrode 316b in the region for the synchronization adjusting TFT Tc through the third contact hole H3.

In addition, the pixel electrode 322 is electrically connected to the extension part DL to form a storage capacitor, which has the extension part as a first electrode and the common line 306 as a second electrode.

At this time, a transparent connection line 324 is also formed on the passivation layer 320. The connection line 324 connects the drain electrode 316a in the region for the driving TFT Ts with the source electrode 314b in the region for the synchronization adjusting TFT Tc. The connection line 324 is disposed over and overlaps the data line 318.

As stated above, a portion where the connection line of the related art is formed may function as an aperture area and a storage capacitor area.

The array substrate for the LCD device according to the second embodiment of the present invention is manufactured through the above-mentioned processes.

The present invention may be used in an in-plane switching (IPS) mode liquid crystal display (LCD) device.

Figure 17:
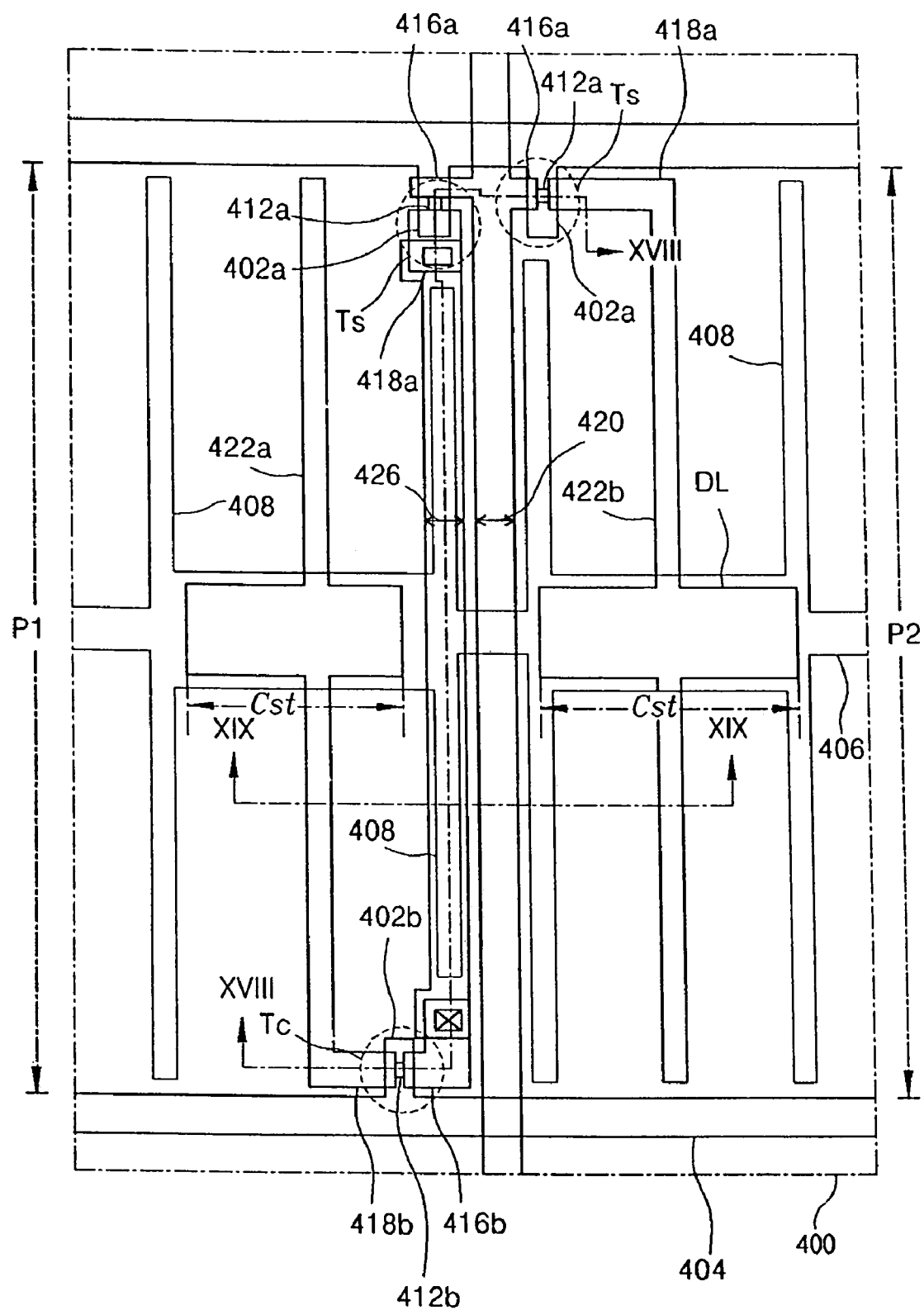
FIG. 17 is a plan view of an array substrate for an in-plane switching mode liquid crystal display device according to a third embodiment of the present invention.

FIG. 17 is a plan view of an array substrate for an IPS mode LCD device according to a third embodiment of the present invention. The IPS mode LCD device of the third embodiment has a data line sharing structure that drives two pixels using one data line. In the third embodiment, a connection line for connecting a driving TFT and a synchronization adjusting TFT is formed of a transparent conductive material, and overlaps a common line. An organic passivation layer having a dielectric constant less than 3 is formed between the connection line and the data line.

As shown in FIG. 17, gate lines 404 are formed in a first direction on a substrate 400 and a data line 420 is formed in a second direction. The data line 420 perpendicularly crosses the gate lines 404 to define pixel regions P1 and P2 adjacent along the first direction, that is, left and right in the context of the figure. A common line 406 is also formed across the pixel regions P1 and P2. The common line 406 is spaced apart from and parallel to the gate lines 404.

A driving TFT Ts is formed in each pixel region P1 and P2 and a synchronization adjusting TFT Tc is formed in the pixel region P1. The synchronization adjusting TFT Tc can be formed in either the odd pixel region or the even pixel region adjoining each other with respect to the data line 420. Thus, the synchronization adjusting TFT Tc may be formed in the pixel region P2.

Each driving TFT Ts includes a gate electrode 402a, an active layer 412a, a source electrode 416a, and a drain electrode 418a. The synchronization adjusting TFT Tc includes a gate electrode 402b, an active layer 412b, a source electrode 416b, and a drain electrode 418b.

Pixel electrodes 422a and 422b are formed in the pixel regions P1 and P2, respectively. The pixel electrode 422a of the pixel region P1 is connected to the synchronization adjusting TFT Tc and the pixel electrode 422b of the pixel region P2 is connected to the driving TFT Ts in the pixel region P2. The pixel electrodes 422a and 422b are parallel to the data line 420. Additionally, a common electrode 408 is formed in each pixel region P1 and P2. The common electrode 408 includes a plurality of patterns, which are parallel to the pixel electrodes 422a and 422b and alternate with the pixel electrodes 422a and 422b in respective pixel regions P1 and P2. The common electrode 408 is connected to the common line 406.

A storage capacitor Cst is formed over the common line 406 in each pixel region P1 and P2. A part of the common line 406 functions as a first electrode and an extension part DL extending from each pixel electrode 422a and 422b acts as a second electrode of the storage capacitor Cst.

The adjacent pixel regions P1 and P2 left and right in the context of the figure receive different signals from the same data line 420. To sequentially transmit the signals, the synchronization adjusting TFT Tc is formed in one of the pixel regions P1 and P2 as stated above.

Therefore, a connection line 426 is also formed to connect the drain electrode 418a of the driving TFT Ts with the source electrode 416b of the synchronization adjusting TFT Tc. The connection line 426 is disposed over the pattern of the common electrode 408 adjacent to the data line 420.

Since a portion where the connection line of the related art is formed may be used as an aperture area, the aperture ratio of the device is increased, and brightness in the adjacent pixel regions with respect to the data line is uniform.

FIGS. 18A to 18D and FIGS. 19A to 19D show a manufacturing method of the array substrate for the IPS mode LCD device according to the third embodiment of the present invention. FIGS. 18A to 18D are cross-sectional views corresponding to the line XVIII-XVIII of FIG. 17 and FIGS. 19A to 19D are cross-sectional views corresponding to the line XIX-XIX of FIG. 17.

Figure 18A:
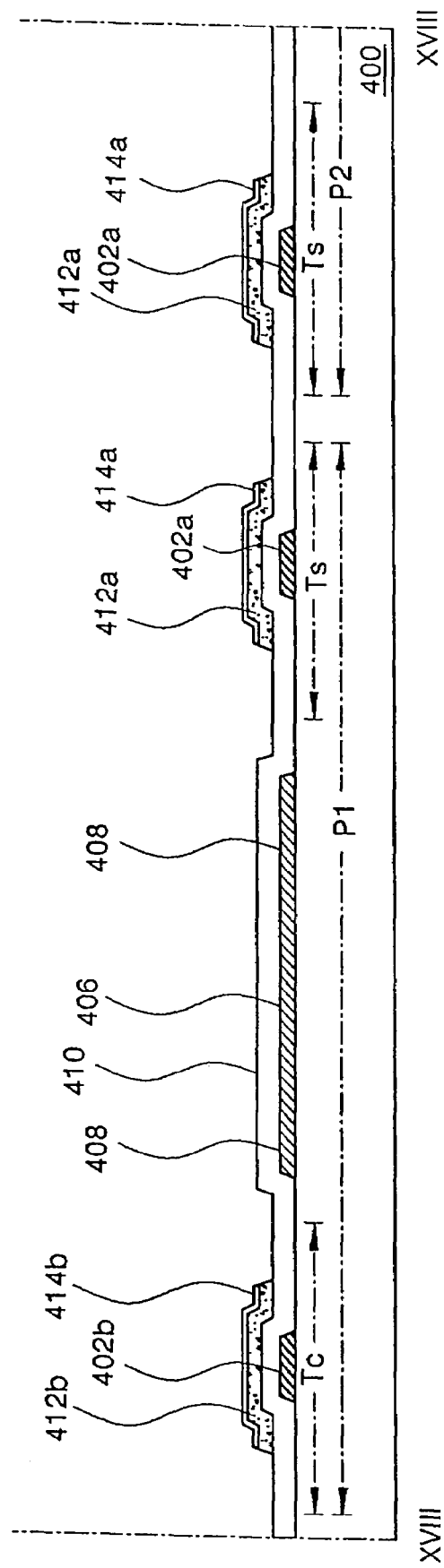
FIGS. 18A to 18D are cross-sectional views showing a manufacturing method of the array substrate according to the third embodiment of the present invention and corresponding to the line XVIII-XVIII of FIG. 17.
Figure 19A:
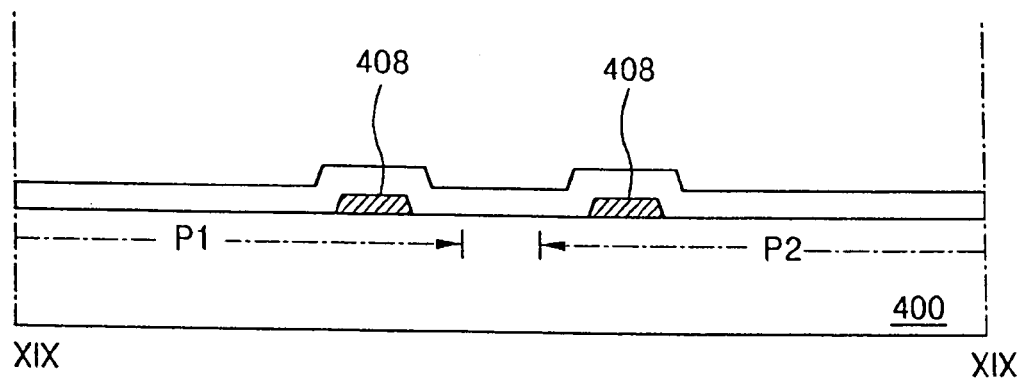
FIGS. 19A to 19D are cross-sectional views showing a manufacturing method of the array substrate according to the third embodiment of the present invention and corresponding to the line XIX-XIX of FIG. 17.

As shown in FIGS. 18A and 19A, pixel regions P1 and P2 are defined on a substrate 400. A region for a driving TFT Ts is defined in each pixel region P1 and P2, and a region for a synchronization adjusting TFT Tc is defined in the pixel region P1. As stated above, the synchronization adjusting TFT Tc may be defined in the pixel region P2.

Gate electrodes 402a and 402b, gate lines 404 of FIG. 17, a common line 406, and common electrodes 408 are formed on the substrate 400 by depositing aluminum or an aluminum alloy and then patterning it. The gate electrodes 402a correspond to the regions for the driving TFTs Ts and the gate electrode 402b corresponds to the region for the synchronization adjusting TFT Tc. The gate lines 404 of FIG. 17 are connected to the gate electrodes 402a and 402b, respectively. That is, one gate line 404 of FIG. 17 is connected to the gate electrodes 402a in the region for the driving TFTs Ts, and another gate line 404 of FIG. 17 is connected to the gate electrode 402b in the region for the synchronization adjusting TFT Tc. Thus, in the pixel region P1, the gate electrode 402a in the region for the driving TFT Ts and the gate electrode 402b in the region for the synchronization adjusting TFT Tc are connected to different gate lines. The common line 406 is parallel to and spaced apart from the gate lines 404 of FIG. 17. In each pixel region P1 and P2, the common electrode 408 has a plurality of patterns and extends from the common line 406 up and down in FIG. 17.

A gate insulating layer 410 is formed on an entire surface of the substrate 400 including the gate electrodes 402a and 402b, the gate lines 404 of FIG. 17, the common line 406, and the common electrodes 408 by depositing an inorganic insulating material such as silicon nitride ($SiN_x$) or silicon oxide ($SiO_2$).

Next, active layers 412a and 412b and ohmic contact layers 414a and 414b are formed on the gate insulating layer 410 by depositing intrinsic amorphous silicon (a-Si:H) and impurity-doped amorphous silicon (n+ or p+ a-Si:H) on an entire surface of the substrate 400 including the gate insulating layer 410 thereon and then patterning them. The active layers 412a and the ohmic contact layers 414a are disposed over the gate electrodes 402a in the regions for the driving TFTs Ts, and the active layer 412b and the ohmic contact layer 414b are disposed over the gate electrode 402b in the region for the synchronization adjusting TFT Tc.

Figure 18B:
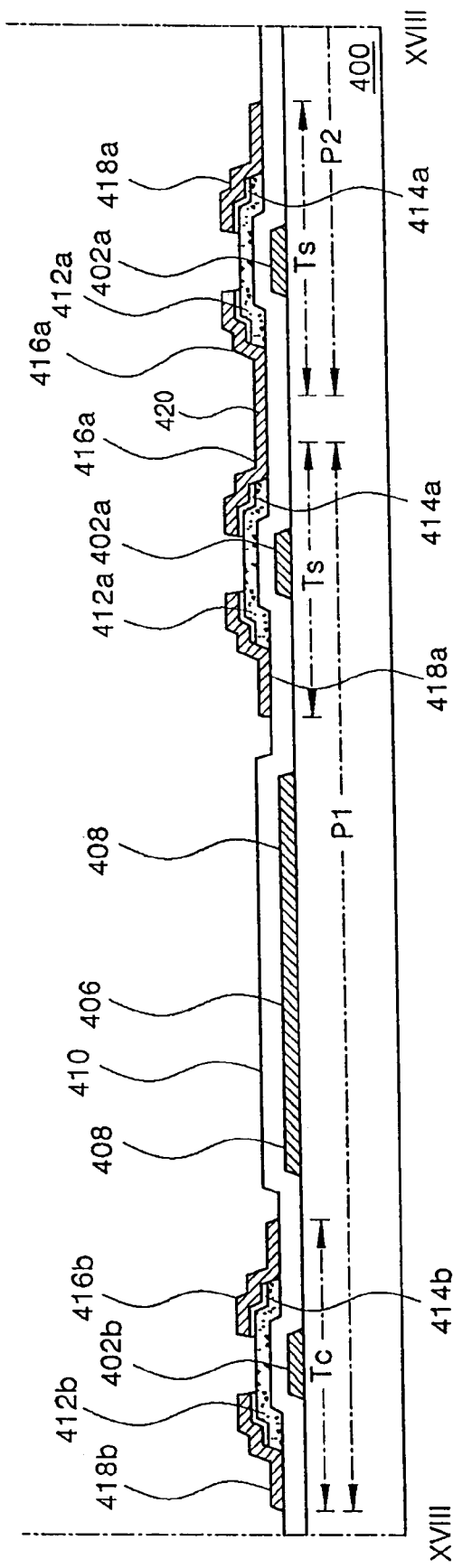
Figure 19B:
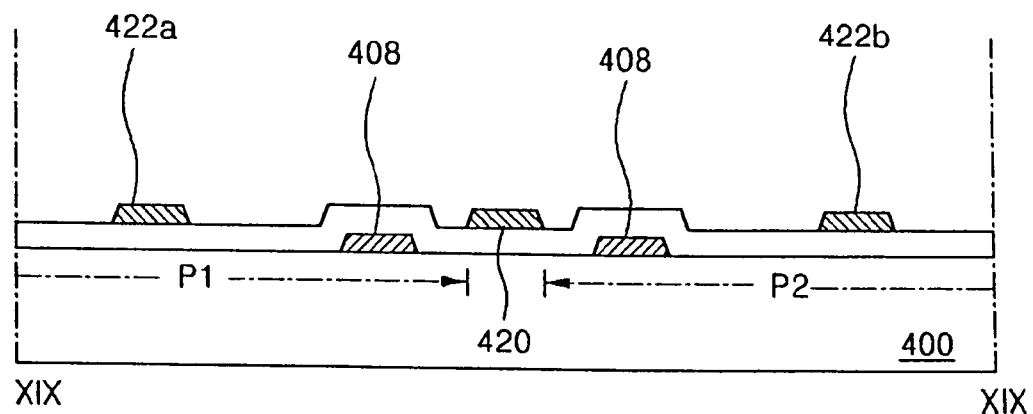

As shown in FIGS. 18B and 19B, source electrodes 416a and 416b and drain electrodes 418a and 418b are formed on the ohmic contact layers 414a and 414b by depositing a metal material on the substrate 400 including the ohmic contact layers 414a and 414b thereon and then patterning the metal material. The metal material may be selected from a metal group including chromium (Cr), molybdenum (Mo), tungsten (W), tantalum (Ta), copper (Cu), and so on. The source electrode 416a and the drain electrode 418a are disposed on and contact the ohmic contact layer 414a in each region for the driving TFT Ts and are spaced apart from each other. The source electrode 416b and the drain electrode 418b are disposed on and contact the ohmic contact layer 414b in the region for the synchronization adjusting TFT Tc.

At the same time, a data line 420 and pixel electrodes 422a and 422b are formed on the gate insulating layer 410. The data line 420 is connected to the source electrodes 416a of the pixel regions P1 and P2. The pixel electrode 422a extends from drain electrode 418b in the region for the synchronization adjusting TFT Tc along the second direction in the pixel region P1 and alternates with the common electrode 408 of the pixel region P1. The pixel electrode 422b extends form the drain electrode 418a in the region for the driving TFT Ts along the second direction in the pixel region P2 and alternates with the common electrode 408 of the pixel region P2.

Figure 18C:
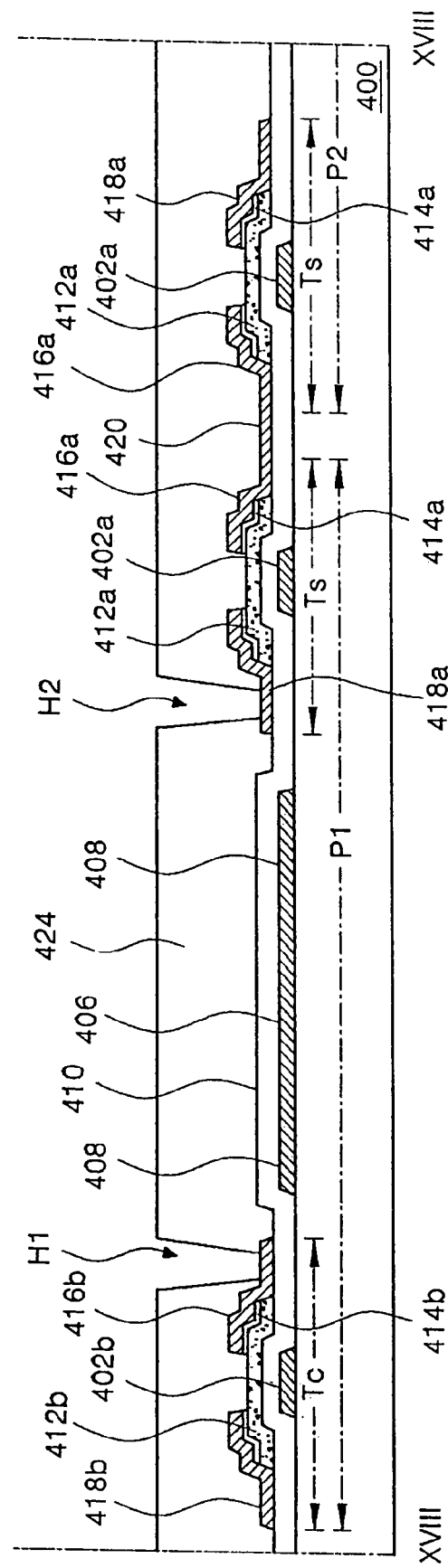
Figure 19C:
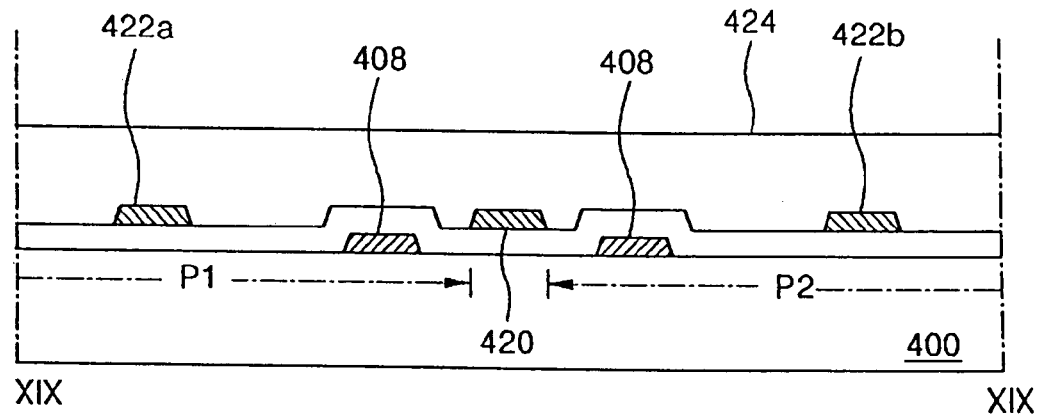

As shown in FIGS. 18C and 19C, a passivation layer 424 is formed on an entire surface of the substrate 400 including the source electrodes 416a and 416b and the drain electrodes 418a and 418b by coating an organic insulating material having a dielectric constant less than 3 such as benzocyclobutene (BCB) or acrylic resin.

Subsequently, the passivation layer 424 is patterned to form first and second contact holes H1 and H2. The first contact hole H1 exposes the source electrode 416b in the region for the synchronization adjusting TFT Tc of the pixel region P1 and the second contact hole H2 exposes the drain electrode 418a in the region for the driving TFT Ts of the pixel region P1.

Figure 18D:
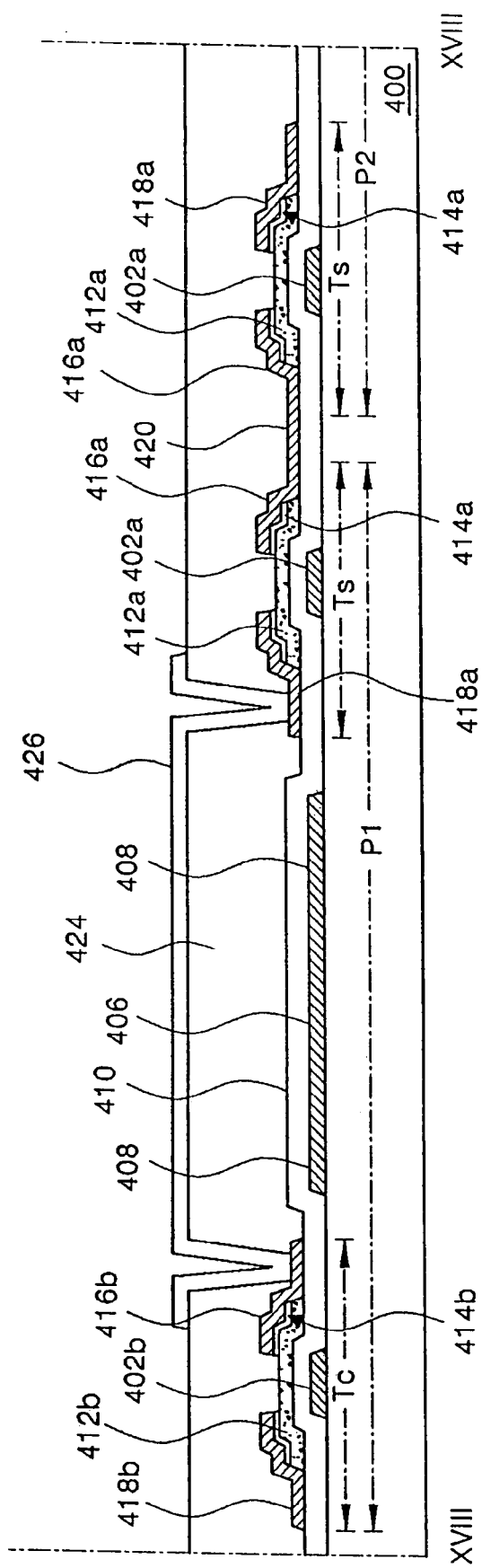
Figure 19D:
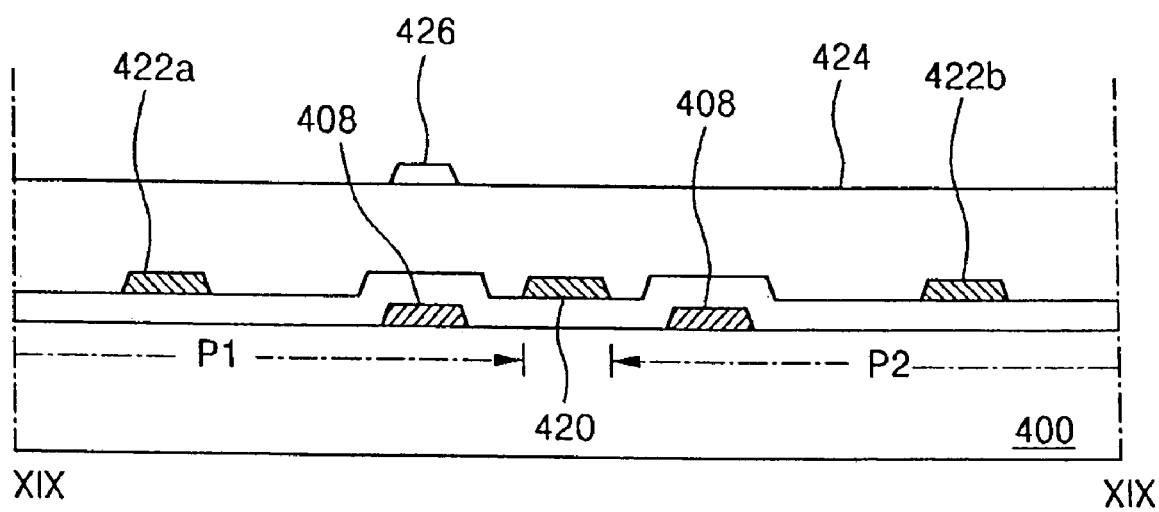

As shown in FIGS. 18D and 19D, a connection line 426 is formed on the passivation layer 424 by depositing a transparent conductive material such as indium tin oxide (ITO) and indium zinc oxide (IZO) on an entire surface of the substrate 400 including the passivation layer 424 and then pattering the transparent conductive material. The connection line 426 is connected to the source electrode 416b in the region for the synchronization adjusting TFT Tc of the pixel region P1 through the first contact hole H1 and connected to the drain electrode 418a in the region for the driving TFT Ts of the pixel region P1 through the second contact hole H2. The connection line 426 is disposed over the pattern of the common electrode 408 adjacent to the data line 420. As seen, the pixel electrodes and the common electrodes are laterally separated by substantially a constant distance.

Figure 20A:
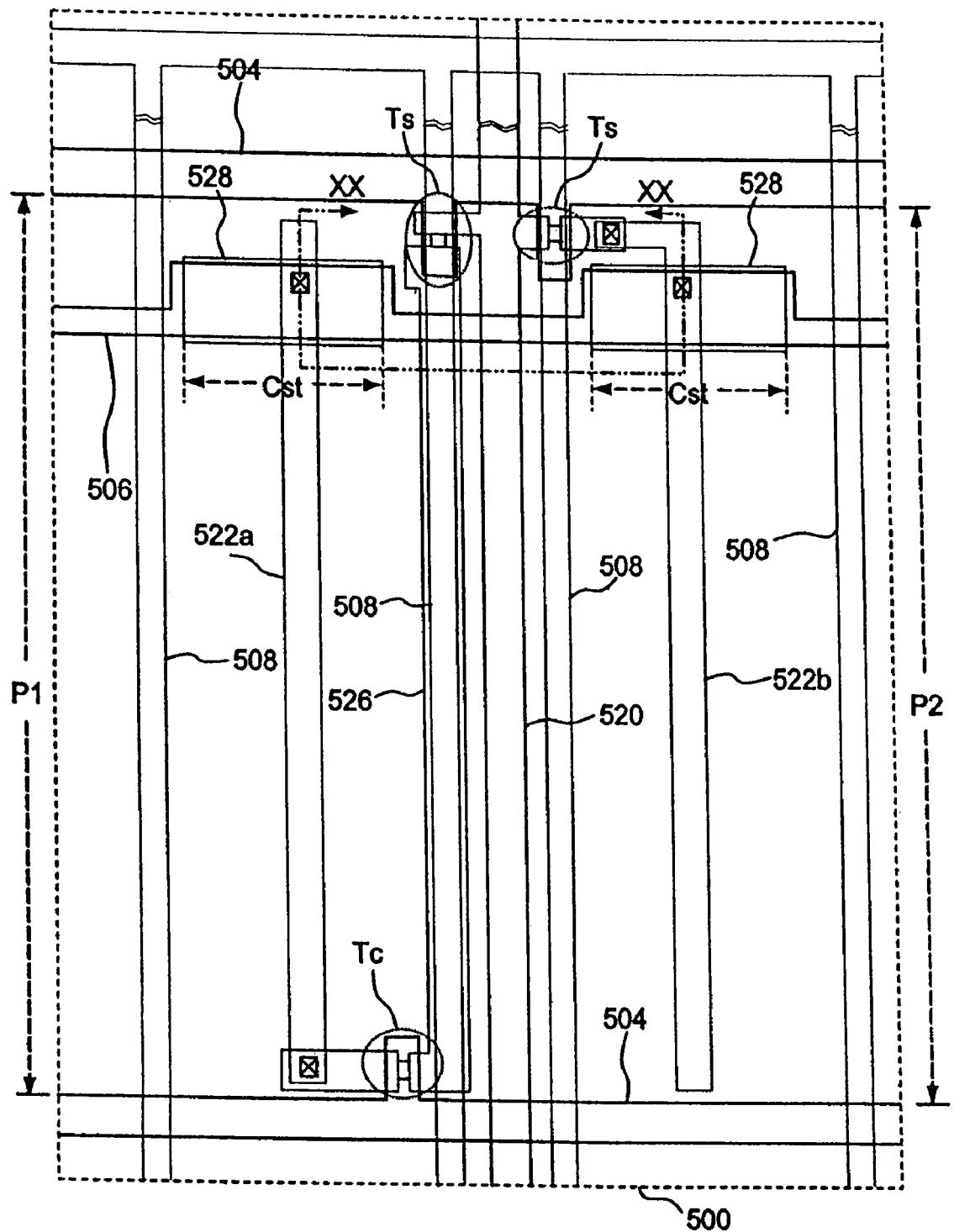
FIGS. 20A and 20B are plan and cross-sectional views, respectively, showing another embodiment of the array substrate according to a fourth embodiment of the present invention.
Figure 20B:
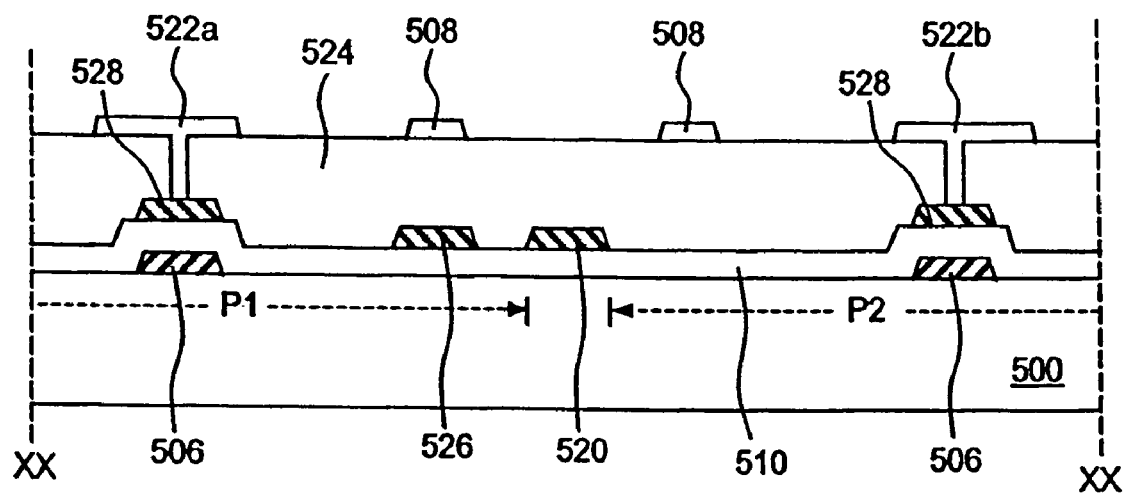

FIGS. 20A and 20B illustrate plan and cross-sectional views of a fourth embodiment. The embodiment of FIGS. 20A and 20B show the plan and cross-sectional views of an in-plane switching mode liquid crystal display (IPS-LCD) device, of which FIG. 20B shows the cross-sectional view along line XX of FIG. 20A. In the IPS-LCD devices, electrodes for driving liquid crystal molecules are formed on the same substrate 500. This mechanism will be described more fully below.

As shown in FIGS. 20A and 20B, pixel regions P1 and P2 are defined by gate lines 504 and data lines 520 on a substrate 500. A common line 506, pixel electrodes 522a and 522b, common electrodes 508, a connection line 526, and a capacitor electrode 528 are also formed on the substrate 500. A region for a driving TFT Ts is defined in each pixel region P1 and P2, and a region for a synchronization adjusting TFT Tc is defined in the pixel region P1. As above, the synchronization adjusting TFT Tc may be disposed in the pixel region P2. Similar to the previous embodiment of FIG. 17, in the pixel region P1, gate electrodes in the region for the driving TFT Ts and in the region for the synchronization adjusting TFT Tc are connected to different gate lines.

In the embodiment, a common line 506 parallel to and spaced apart from the gate lines 504 is formed on the substrate 500 by photolithography or some other similar technique. The common line 506 has a section in which the width is substantially larger than the width of the section of the common line 506 that crosses the data lines 520 and the connection line 526 and the common electrodes 508. A gate insulating layer 510 is formed on an entire surface of the substrate 500 including the common line 506 by depositing an inorganic insulating material such as silicon nitride ($SiN_x$) and or silicon oxide ($SiO_2$).

The data lines 520 and connection line 526 that is to connect the driving TFT Ts and synchronization adjusting TFT Tc are formed adjacent to each other on the gate insulating layer 510. The data lines 520 and connection line 526 are formed on the same layer and may be formed of the same material. This is to say that, to increase the aperture ratio of the pixels, the connection line 526 is formed of a transparent material such as indium tin oxide or indium zinc oxide. The data lines 520 may be formed of the same material and at the same time as the connection line 526, or may be formed of an opaque conductive material such as copper or aluminum at a different time than when the connection line 526 is formed.

A capacitor electrode 528 is formed over the wide section of the common line 506 using standard photolithographic techniques. The capacitor electrode 528 is formed of the same material and at the same time as the connection line 526. Thus, similar to the data lines 520, the capacitor electrode 528 is formed on the same gate insulating layer 510 as the connection line 526.

A passivation layer 524 is formed on an entire surface of the substrate 500 including the capacitor electrode 528, data lines 520 and connection line 526 by coating a relatively thick organic insulating material having a dielectric constant less than 3 such as benzocyclobutene (BCB) and or acrylic resin. Similar to the previous embodiments, once the passivation layer 524 is coated on the substrate, the passivation layer 524 may be planarized by standard processing techniques. After planarization, a contact hole is formed in the passivation layer 524 permitting access to the capacitor electrode 528.

Pixel electrodes 522a and 522b and common electrodes 508 are subsequently formed on the passivation layer 524 disposed parallel to the data lines 520. The pixel electrodes 522a and 522b are formed over and are connected to the capacitor electrode 528 through the contact hole, thereby forming a capacitor Cst with the wide section of the common line 506. The common electrodes 508 are formed over the connection lines 526 and are connected to each other in a peripheral portion of the substrate 500. As the common electrodes 508 and common lines 506 are not connected to each other, signals applied to the common electrodes 508 may be different from signals applied to the common lines 506. The pixel electrodes 522a and 522b and common electrodes 508 are formed of a transparent material, again such as ITO or IZO.

The IPS liquid crystal display device uses a voltage applied across the pixel electrodes 522a and common electrodes 508 to produce an in-plane electric field through liquid crystal molecules of the liquid crystal layer (not shown). The liquid crystal molecules have a positive dielectric anisotropy, and thus the liquid crystal molecules will align parallel with the electric field. The viewing angles can range 80 to 85 degrees in up-and-down and left-and-right sides from a line vertical to the IPS device, for example. Thus, although only one pixel electrode is shown as being disposed in each pixel region, while multiple common electrodes are shown as being disposed in each pixel region, the number of electrodes in each pixel region may be different dependent on the electric field desired.

Thus, in each of the embodiments shown in the figures, the connection line overlaps either the data line or the common electrode such that a majority of the connection line is overlapped. A relatively small amount of the connection line is used to form the connections to the synchronization adjusting transistor and the driving transistor. The connection line and the pixel electrode are formed simultaneously and are formed of the same, transparent material such as an indium oxide (e.g. ITO or IZO). This permits the connection line to be formed, for example, over the data line rather than adjacent to the data line on the same layer and thus increases the aperture ratio of the pixel region. Further, addition of the connection line does not substantially change the aperture of the pixel region.

As stated above, since the connection line of the related art is formed in a location that may be used as an aperture area of the pixel region, the aperture ratio of the new device disclosed herein is increased, and brightness in the adjacent pixel regions with respect to the data line is uniform. Therefore, a high quality image may be displayed.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A manufacturing method comprising:
    forming first and second gate lines extending in a first direction on a substrate;
    forming a data line extending in a second direction on the substrate, the data line crossing the first and second gate lines to define first and second pixel regions adjacent along the first direction;
    forming first and second driving thin film transistors in the first and second pixel regions, respectively, the first and second driving thin film transistors connected to the first gate line and the data line;
    forming a synchronization adjusting thin film transistor in the first pixel region, the synchronization adjusting thin film transistor connected to the second gate line;
    forming a connection line connected to the first driving thin film transistor and the synchronization adjusting thin film transistor, the connection line disposed over the data line; and
    forming first and second pixel electrodes in the first and second pixel regions, respectively, the first pixel electrode connected to the synchronization adjusting thin film transistor, the second pixel electrode connected to the second driving thin film transistor.

2. The method of claim 1, wherein forming the connection line is simultaneously performed with forming the first and second pixel electrodes.

3. The method of claim 2, wherein the connection line comprises an indium oxide.

4. The method of claim 1, further comprising forming an organic passivation layer between the data line and the connection line.

5. The method of claim 4, wherein the organic passivation layer has a dielectric constant less than 3 and is transparent.

6. The method of claim 5, wherein the organic passivation layer comprises benzocyclobutene (BCB) or acrylic resin.

7. The method of claim 1, wherein source electrodes of the first and second driving thin film transistors are connected to the data line.

8. The method of claim 1, wherein the connection line is connected to a drain electrode of the first driving thin film transistor and a source electrode of the synchronization adjusting thin film transistor.

9. The method of claim 1, wherein the first and second gate lines are spaced apart from each other.

10. A manufacturing method comprising:
    forming first and second gate lines extending in a first direction;
    forming a data line extending in a second direction on the substrate, the data line crossing the first and second gate lines to define a first pixel region;
    forming a driving thin film transistor connected to the first gate line and the data line;
    forming a synchronization adjusting thin film transistor connected to the second gate line and the data line;
    forming a connection line connected to the driving thin film transistor and the synchronization adjusting thin film transistor, the connection line disposed over the data line; and
    forming a pixel electrode in the pixel region and connected to the synchronization adjusting thin film transistor.

11. The method of claim 10, wherein the first gate line is connected to a synchronization adjusting thin film transistor in a second pixel adjacent to the first pixel region along the second direction.

12. The method of claim 10, wherein forming the connection line is simultaneously performed with forming the pixel electrode.

13. The method of claim 12, wherein the connection line comprises an indium oxide.

14. The method of claim 10, further comprising forming an organic passivation layer between the data line and the connection line.

15. The method of claim 14, wherein the organic passivation layer has a dielectric constant less than 3 and is transparent.

16. The method of claim 15, wherein the organic passivation layer comprises benzocyclobutene (BCB) or acrylic resin.

17. An array substrate comprising:
a substrate;
first and second gate lines extending in a first direction on the substrate;
a data line extending in a second direction crossing the first and second gate lines to define first and second pixel regions adjacent along the first direction;
first and second driving thin film transistors in the first and second pixel regions, respectively, and connected to the first gate line and the data line;
a synchronization adjusting thin film transistor in the first pixel region and connected to the second gate line;
first and second pixel electrodes in the first and second pixel regions, respectively, the first pixel electrode connected to the synchronization adjusting thin film transistor, the second pixel electrode connected to the second driving thin film transistor;
first and second common electrodes in the first and second pixel regions, respectively, the first common electrode parallel to and alternating with the first pixel electrode, the second common electrode parallel to and alternating with the second pixel electrode; and
a connection line connected to the first driving thin film transistor and the synchronization adjusting thin film transistor, the connection line overlapping the first common electrode along the second direction.

18. The array substrate of claim 17, further comprising an organic passivation layer between the first common electrode and the connection line.

19. The array substrate of claim 18, wherein the organic passivation layer has a dielectric constant less than 3 and is transparent.

20. The array substrate of claim 17, further comprising a storage capacitor having a first extension part extending from a drain electrode of the synchronization adjusting thin film transistor as a first electrode and a second extension part extending from the first common electrode.

21. The array substrate of claim 17, further comprising a common line between the first and second gate lines, the common line connected to the first and second common electrodes.

22. The array substrate of claim 17, wherein the connection line is disposed over the first common electrode.

23. The array substrate of claim 22, wherein the connection line is formed of a transparent conductive material.

24. The array substrate of claim 22, wherein the first and second pixel electrodes are formed of a same material as the data line.

25. The array substrate of claim 24, wherein the first and second pixel electrodes and the data line comprise a transparent conductive material.

26. The array substrate of claim 17, wherein the first common electrode is disposed over the connection line.

27. The array substrate of claim 26, wherein the connection line and the data line are formed in a same layer.

28. The array substrate of claim 27, wherein connection line and the data line comprise a transparent conductive material.

29. The array substrate of claim 26, wherein the first and second pixel electrodes and the first and second common electrodes are formed in a same layer.

30. The array substrate of claim 29, wherein the first and second pixel electrodes and the first and second common electrodes comprise transparent conductive material.

31. A manufacturing method comprising:
forming first and second gate lines extending in a first direction on the substrate;
forming a data line extending in a second direction crossing the first and second gate lines to define first and second pixel regions adjacent along the first direction;
forming first and second driving thin film transistors in the first and second pixel regions, respectively, the first and second driving thin film transistors connected to the first gate line and the data line;
forming a synchronization adjusting thin film transistor in the first pixel region and connected to the second gate line;
forming first and second pixel electrodes in the first and second pixel regions, respectively, the first pixel electrode connected to the synchronization adjusting thin film transistor, the second pixel electrode connected to the second driving thin film transistor;
forming first and second common electrodes in the first and second pixel regions, respectively, the first common electrode parallel to and alternating with the first pixel electrode, the second common electrode parallel to and alternating with the second pixel electrode; and
forming a connection line connected to the first driving thin film transistor and the synchronization adjusting thin film transistor, the connection line overlapping the first common electrode along the second direction.

32. The method of claim 31, further comprising forming an organic passivation layer between forming the first and second common electrodes and forming the connection line.

33. The method of claim 32, wherein the organic passivation layer has a dielectric constant less than 3 and is transparent.

34. The method of claim 33, wherein the organic passivation layer comprises benzocyclobutene (BCB) or acrylic resin.

35. The method of claim 31, wherein forming the first and second pixel electrodes are simultaneously performed with forming the data line.

36. The method of claim 31, wherein the connection line is formed over the first common electrode.

37. The method of claim 36, wherein the connection line comprises an indium oxide.

38. The method of claim 36, wherein the first and second pixel electrodes are formed of a same material as the data line.

39. The method of claim 31, wherein the first common electrode is formed over the connection line.

40. The method of claim 39, wherein the connection line and the data line are formed in a same layer.

41. The method of claim 39, wherein the first and second pixel electrodes and the first and second common electrodes are formed in a same layer.

42. The method of claim 41, wherein the first and second pixel electrodes and the first and second common electrodes comprise transparent conductive material.

43. A method of increasing an aperture of a pixel region, the method comprising:
forming gate lines and data lines on a substrate;
forming a driving thin film transistor and a synchronization adjusting thin film transistor in the pixel region, the driving thin film transistor and the synchronization adjusting thin film transistor connected to different gate lines; and
connecting the driving thin film transistor and the synchronization adjusting thin film transistor though a connection line that overlaps a conductive line along a direction of extension of the conductive line.

44. The method of claim 43, further comprising forming the connection line over one of the data lines.

45. The method of claim 43, further comprising forming a common line between the different gate lines, the common line extending in a particular direction and having a common electrode extending in a different direction than the particular direction.

46. The method of claim 45, further comprising forming the connection line over the common electrode.

47. The method of claim 43, further comprising forming the connection line such that the aperture of the pixel region is not substantially changed by the presence of the connection line.

48. The method of claim 43, further comprising forming a pixel electrode simultaneously with the connection line.

49. The method of claim 43, further comprising forming the connection line on a different layer than the data lines.

50. The method of claim 43, further comprising overlapping a majority of the connection line with the conductive line.

* * * * *